United States Patent [19]

Uhri

[11] Patent Number: 4,638,254
[45] Date of Patent: Jan. 20, 1987

[54] METHOD OF DETERMINING AND DISPLAYING THE ORIENTATION OF SUBSURFACE FORMATIONS

[75] Inventor: Duane C. Uhri, Grand Prairie, Tex.

[73] Assignee: Mobil Oil Corporation, New York, N.Y.

[21] Appl. No.: 490,919

[22] Filed: May 2, 1983

[51] Int. Cl.$^4$ .............................................. G01V 3/38
[52] U.S. Cl. ................................... 324/323; 324/366; 73/152; 364/422
[58] Field of Search ................. 324/323, 366; 364/422; 73/152; 367/25

[56] References Cited

PUBLICATIONS

Nederlof et al., "A Three Dimensional Vector Method as an Aid to Continuous Dipmeter Interpertation", 1971, Geologie Mijnbouw vol. 50 (6), pp. 725–732.

Primary Examiner—Ernest F. Karlsen
Assistant Examiner—Walter E. Snow
Attorney, Agent, or Firm—Alexander J. McKillop; Michael G. Gilman; Charles J. Speciale

[57] ABSTRACT

The preferred geological orientation of geological formations is determined by geological measurements. These measurements are represented by original vectors which are converted into lineations which represent the extension of the vectors to their intersections with a unit sphere. One of the original vectors is designated as a reference and the half axes of all lineations within 90° of the reference are selected and transformed into unit vectors. The selected unit vectors are vector averaged to produce a resultant vector and the magnitude is determined. The steps are repeated for each of the original vectors and the resultant vector having the maximum magnitude is selected as the preferred orientation of the formation.

13 Claims, 26 Drawing Figures

RESULTANT AZIMUTH = 0.0° OR 180.0°

METHOD OF DETERMINING AND DISPLAYING THE ORIENTATION OF SUBSURFACE FORMATIONS

BACKGROUND OF THE INVENTION

This invention relates to the determination of geoligical orientations, and more particularly, to a method of determining and displaying these preferred orientations.

In geophysical exploration, for example, the mapping of subsurface formations is important. Plots depicting the depth, dip and azimuth (i.e., azimuth of the dip) of subsurface formations are important geophysical tools. Many different types of measurements are made to provide the raw data from which the depth, dip and azimuth of the subsurface formations are determined. Seismic exploration, well logging and gravimetric measurements, for example, have been used to provide data regarding the depth, dip and azimuth of subsurface formations. Usually, these measurements do not consistently represent the true dip and azimuth of the formations. For this reason, it is common to apply a smoothing or averaging procedure to the raw measurements in order to determine the preferred orientation of the subsurface formations. See *Structural Geology*, M. P. Billings, Prentice Hall, 3rd Ed. 1972, p. 377, for a discussion of the manner of determining and depicting the preferred orientation of subsurface formations.

Structural geologists, petrologists, sedimentologists and others use three-dimensional orientation analysis in their studies of the depositional environments. Examples of the gathering of measurements which supply three-dimensional data regarding the earth's subsurface include U.S. Pat. No. 4,241,429—Bloomquist et al wherein seismic measurements are made in a manner which can be used to determine the three-dimensional orientation of the subsurface layering of the earth. Another extensively used measuring technique includes the use of a dipmeter logging tool. Dipmeter logging is described in "The High Resolution Dipmeter Tool", *Log Analyst*, Vol. 10, No. 3 (May-June, 1969), pp. 3-11, Allaud, L. A., and Ringot, J; "Automatic Computation of Dipmeter Logs Digitally Recorded on Magnetic Tapes", JPT (July, 1962), pp. 771-782, Moran J. H., Coufleau, M. A., Miller, G. K., and Timmons, J. P.; "The Continuous Dipmeter as a Tool for Studies of Directional Sedimentation and Directional Tectonics", SPWLA 9th Annual Logging Symposium (June 23-26, 1968), pp. G1-25, Rodriquez, A. R., and Pirson, S. J.; and "A Three Dimensional Vector Method as an Aid to Continuous Dipmeter Interpretation", *Geologie En Mijnbouw*, Vol. 50, No. 6 (1971), pp. 725-732.

It is an object of the present invention to determine and depict the preferred orientations in depositional environments and in other orientation studies as represented by dipmeter, petrofabric and other geological and geophysical measurements.

SUMMARY OF THE INVENTION

In accordance with the present invention, the preferred geological orientation is determined by converting geological measurements, such as the dip and azimuth of the dip of the subsurface formations, into unit vectors. These unit vectors are converted into lineations which represent axes passing through the center of a unit reference sphere. Each of these axes is then converted into two oppositely directed unit vectors, one being the original vector and the other being the backward extension to the reference sphere. All of the original unit vectors are each in turn designated as a reference vector. All vectors within 90° of the reference vector are selected and the selected vectors are averaged to produce a resultant vector. The resultant vector having the maximum magnitude is used to indicate the preferred orientation of the formation.

In one embodiment, the invention is applied to dipmeter logging measurements to produce a useful output plot on which lines have an inclination representing the azimuth of the resultant vector, a horizontal position representing the dip of the selected resultant vector, and a vertical position representing the depth at which the measurement was made. This produces a plot which is similar to the known dipmeter "tadpole" plot, but one on which the resultant vector is represented.

In accordance with another aspect, the invention is applied to measurements made in successive depth intervals so that the preferred orientation for each successive depth interval is determined. In accordance with another aspect of the present invention, a moving depth interval is applied to the measurements. The preferred orientation is determined with this moving depth interval at successive increments of depth.

In accordance with another aspect of the invention, the special case where more than one resultant vector has the same maximum magnitude is resolved to determine the preferred orientation.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
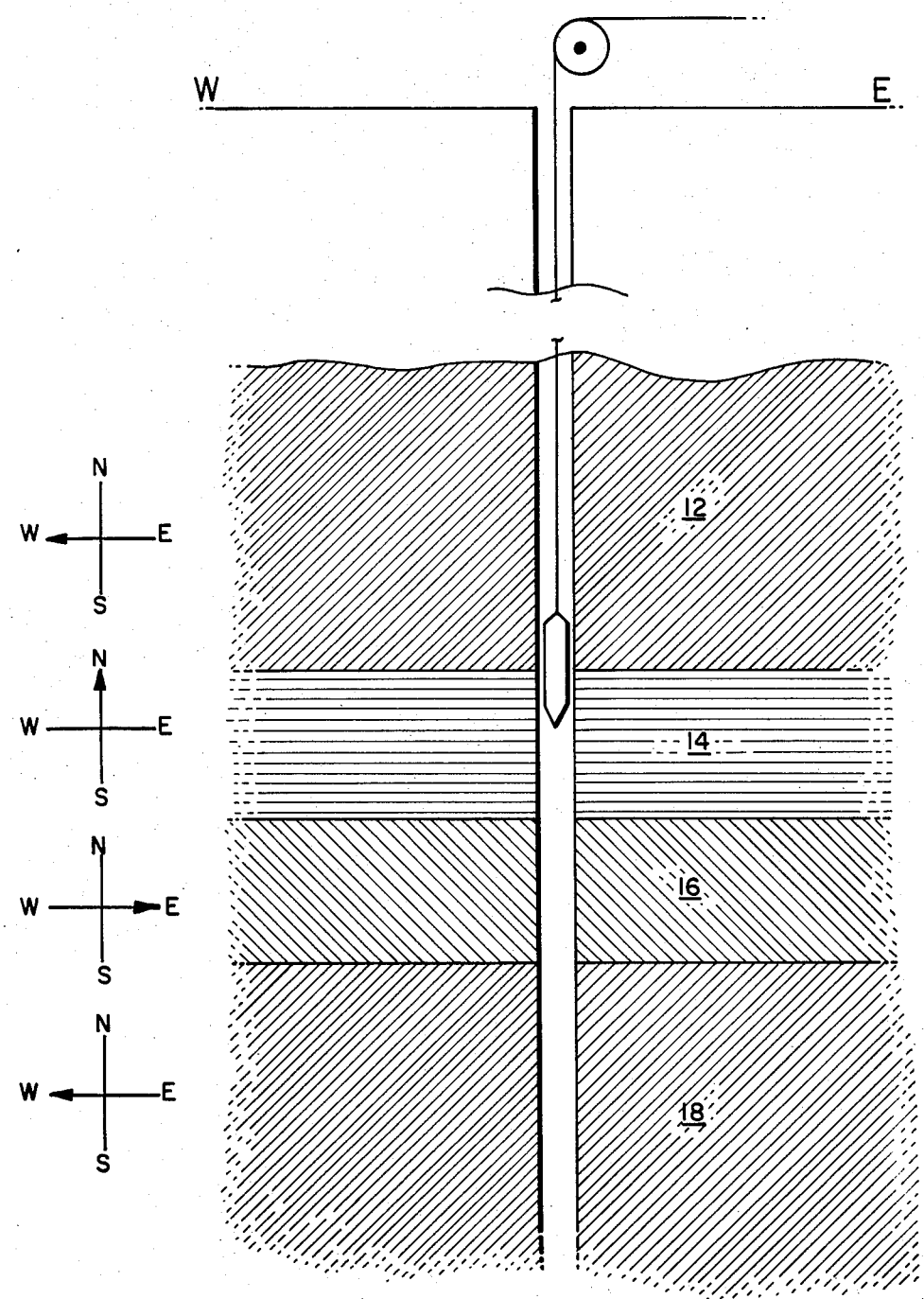
FIG. 1 depicts a cross-section of the earth upon which a dipmeter logging operation is performed.

Referring to FIG. 1, which represents an east-west vertical cross-section, a dipmeter logging tool is shown traversing a borehole through the formations. In this instance, the formations include a layer 12 having a dip of approximately 45° and having an azimuth in the westerly direction. Formation 14 has essentially no apparent dip in the east-west vertical plane, but actually dips 45° in approximately the northerly direction. Formation 16 has a dip of approximately 45° with an azimuth in the easterly direction and formation 18 has a dip of about 45° with an orientation, or azimuth, generally in the westerly direction. From the dipmeter measurements, the preferred orientation of each of the formations is to be determined.

Figure 17:
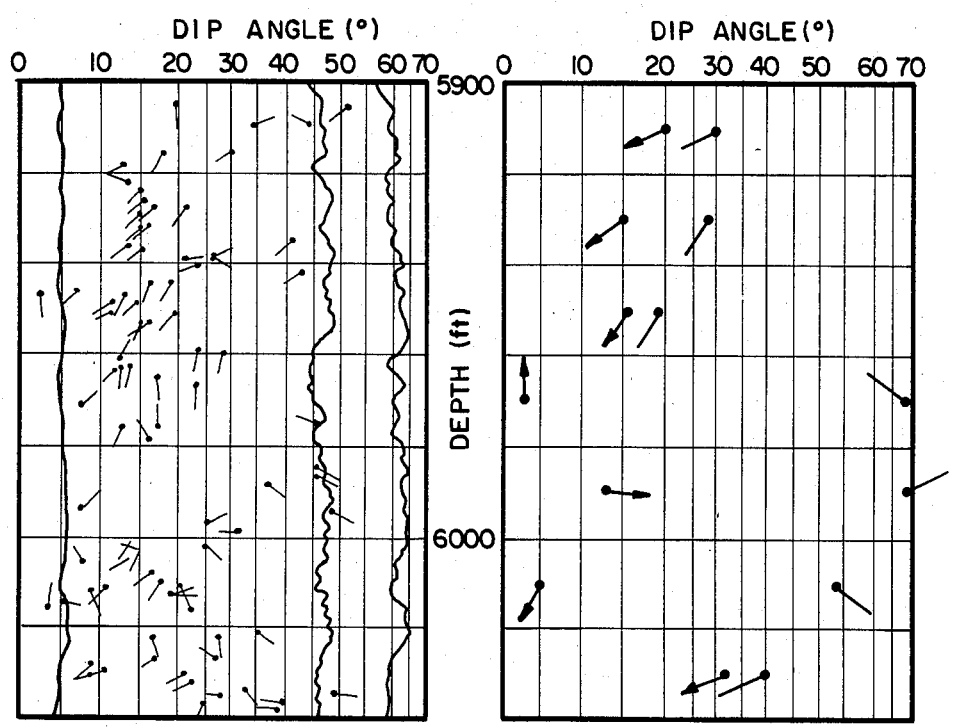
FIG. 17 is similar to FIG. 16 but additionally shows the results of a conventional vector averaging procedure.

Commonly, dipmeters have a plurality of electrical resistance measuring elements spaced around the circumference of the logging tool. The measurements of the earth's resistivity at these measuring element locations are converted into values of the dip and azimuth of the formation surrounding the borehole. A plurality of these measurements are made over the depth interval that is logged in the borehole. The left-hand side of FIG. 17 depicts the display resulting from a plurality of dipmeter measurements. Each of the solid circles on the left-hand side of FIG. 17 is placed at a horizontal position relative to the dip scale at the top which indicates the dip of the formation, in this case from 0° to 70°. Each of the lines directed outward from the solid circles has an inclination which indicates the azimuth of the formation; i.e., straight up is north, straight down is south, left is west and right is east. Each of the solid circles is positioned relative to a vertical depth scale to indicate the depth of the formation. From this confusing plethora of measurement results, the preferred orientation of the formations must be determined. This is a long-standing problem in geophysics, and it will subsequently be shown that prior art techniques of determining preferred orientation are ambiguous and misleading. The present invention produces, in the dipmeter case, a display shown at the right-hand side of FIG. 17 wherein the lines having arrowheads indicate the preferred orientation of the formations obtained from the measurement results depicted on the left-hand side. It will be shown that the present invention produces more reliable and accurate results than prior art techniques of determining preferred orientation.

Figure 2:
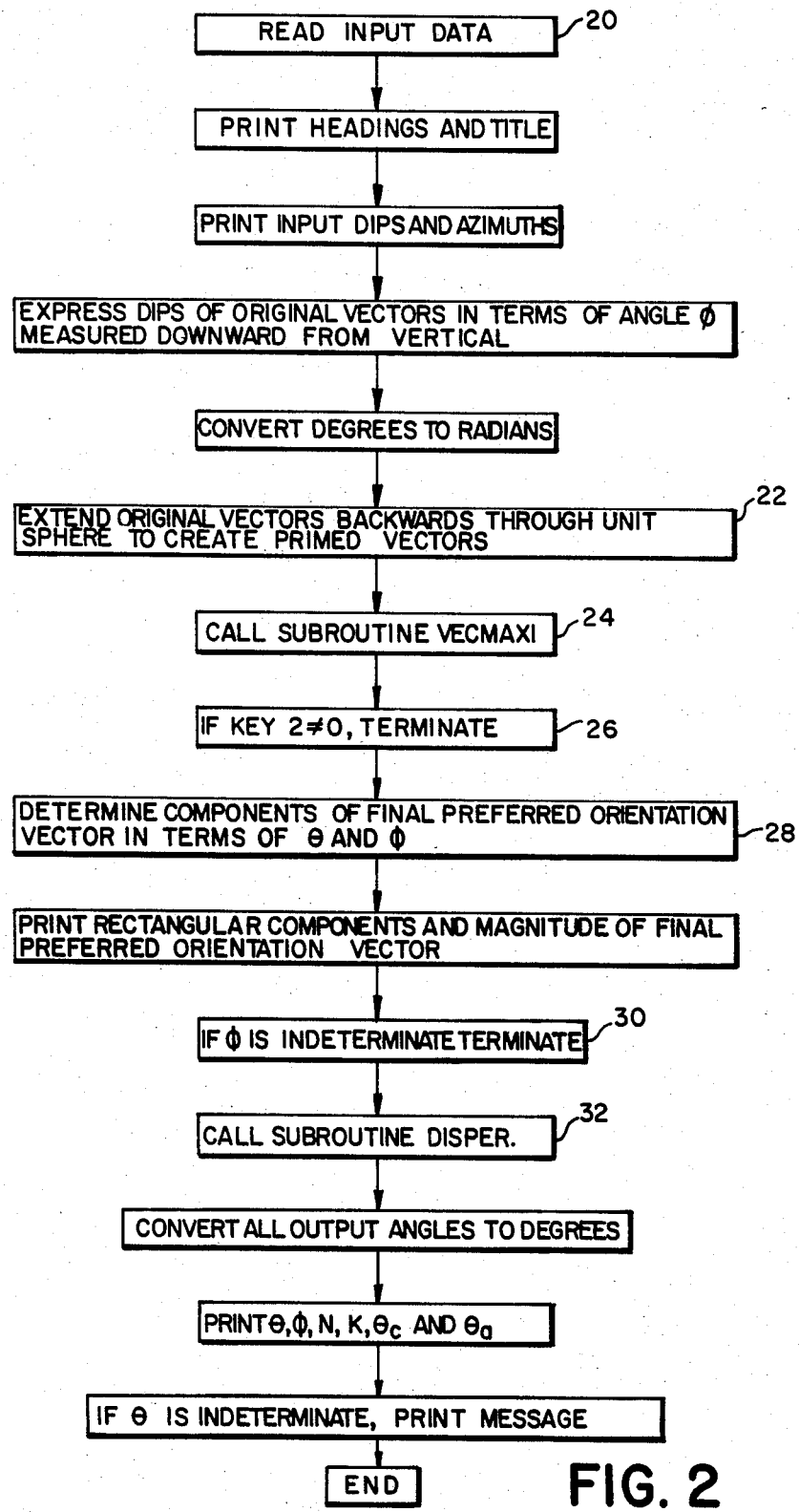
FIG. 2 is a flow chart depicting the invention.
Figure 2A:
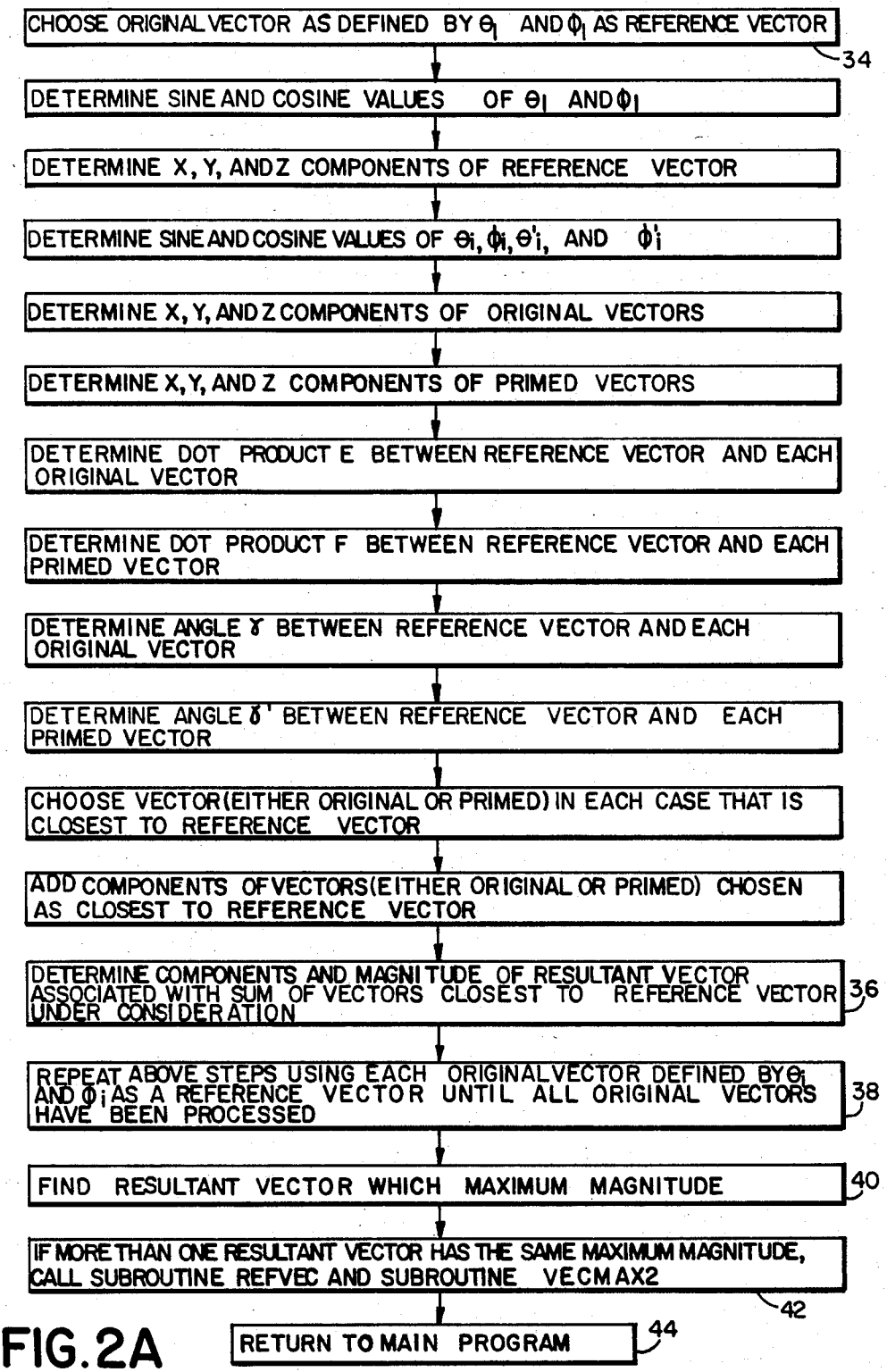
FIG. 2A is a flow chart of subroutine VECMAX1 which determines the vector having the maximum magnitude.
Figure 2B:
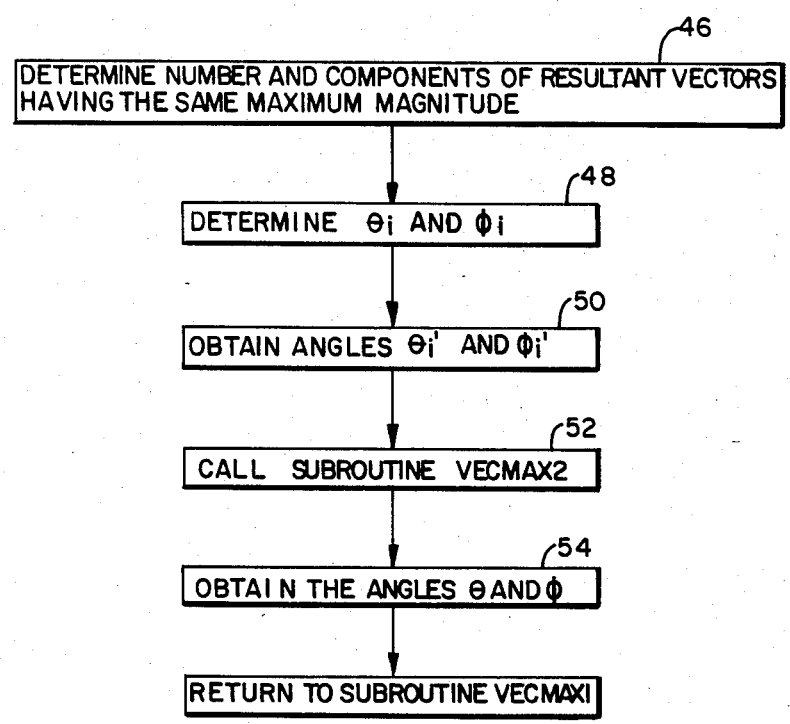
FIG. 2B is a flow chart of subroutine REFVEC which is called up if there is more than one resultant vector having the same maximum magnitude.

FIGS. 2, 2A and 2B depict the operation of the present invention as performed on a digital computer. Before describing this process in detail it is useful to consider FIGS. 3-15 which explain the invention with a series of graphical illustrations. Although the invention is most useful for three-dimensional orientation studies, it is advantageous for simplicity and ease of comprehension to restrict the following discussion to two dimensional azimuth orientation problems. The procedure followed is the same in either case.

Figure 3:
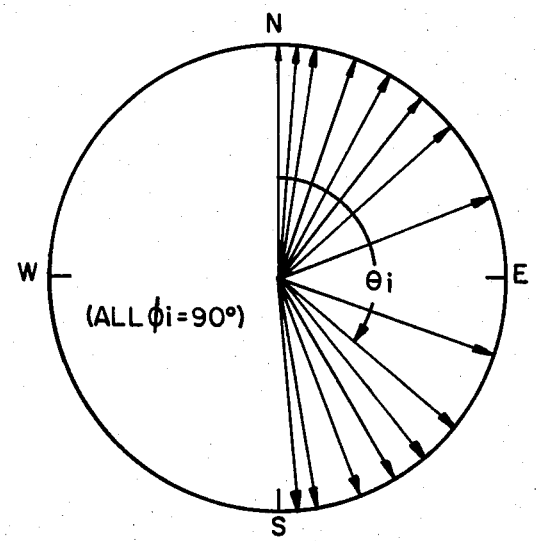
FIG. 3 depicts an example of 15 measurements of azimuth and dip.
Figure 4:
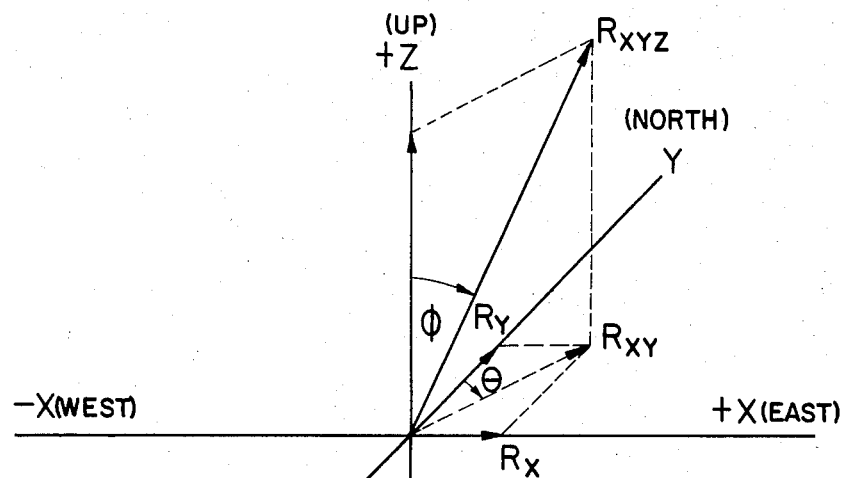
FIGS. 4 and 5 show the coordinate system used in describing the example.
Figure 5:
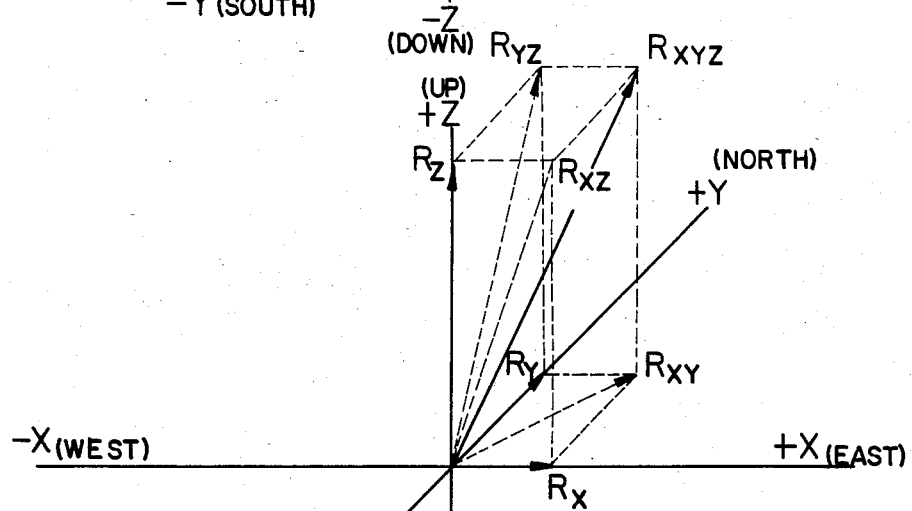

First, consider the azimuth orientation example illustrated in FIG. 3. Each of the vectors represents a measurement result. Since this is an azimuth problem (i.e., all dips are zero), imagine the unit vectors shown as lying on a flat horizontal surface. Refer to these vectors as the "original vectors". The $\theta_i$ designate the azimuths and the $\phi_i$ represent the dips plus 90°. FIGS. 4 and 5 depict the coordinate system and the $\phi$ and $\phi$ angles.

Figure 6:
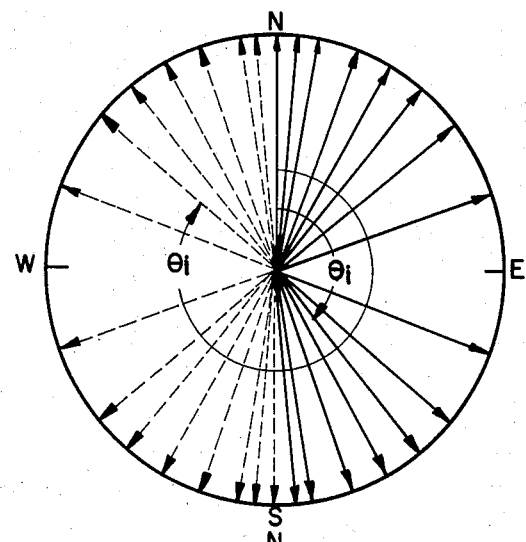
FIG. 6 shows the extension of the vectors of FIG. 3 into lineations.

The present invention takes the original vectors and projects them backwards through the unit sphere associated with these vectors to obtain "primed vectors". This step is illustrated in FIG. 6 where, for the two dimensional case under consideration, the unit sphere is represented as a unit circle. The solid lines designate the original vectors and the dashed lines the primed vectors. The primed vectors are defined by $\theta_i'$. In three dimensions, these are designated by $\theta_i'$ and $\phi_i'$.

Figure 7:
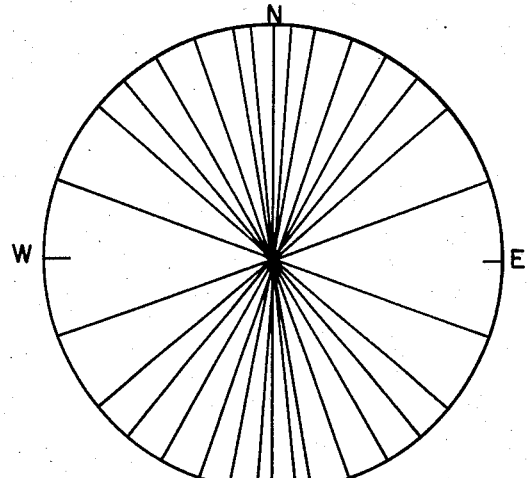
FIG. 7 depicts the axes representation of FIG. 6.

In the next step, each original vector and its primed counterpart is transformed into an axis through the unit sphere (or circle). For this example, this amounts to removing the vector arrowheads and constructing unit circle diameters, which are referred to as lineations, or axes, as shown in FIG. 7. These lineations represent the conversion of each original vector to a diameter through a unit sphere. From inspection of FIG. 7, we can see that the solution to the problem should indicate a preferred north-south orientation.

Figure 8:
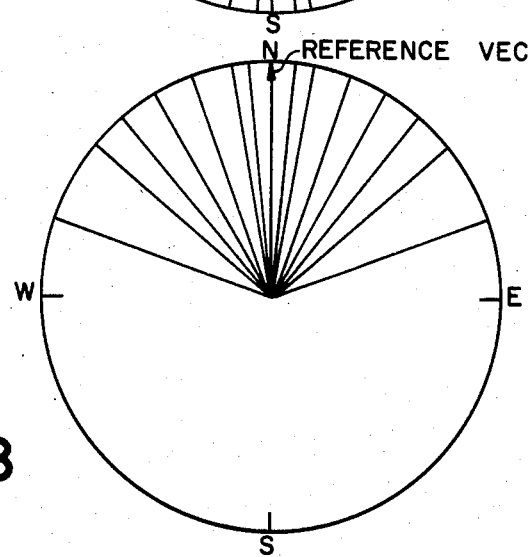
FIG. 8 shows the initial reference vector and related half axes associated with FIG. 3.

The present invention designates the original vector defined by $\theta_1$ and $\phi_1$, as "reference vector" number 1. The half-axes of all lineations within less than 90° of this reference vector are selected as illustrated in FIG. 8.

Figure 9:
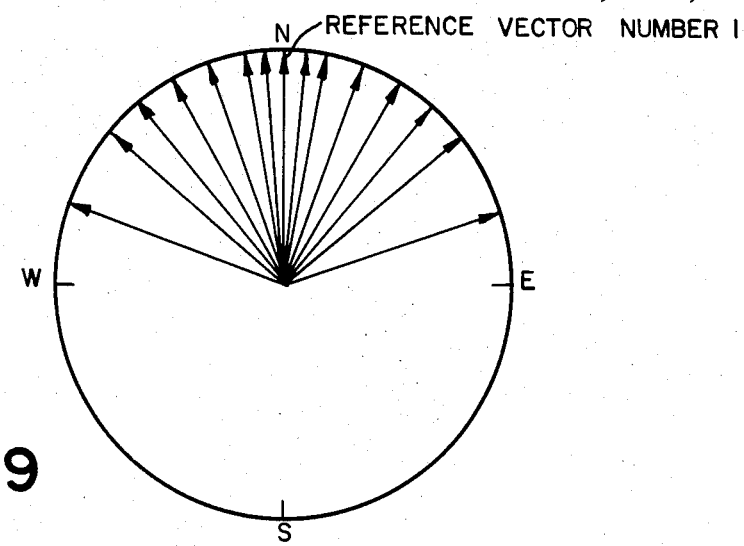
FIG. 9 shows the vectors associated with reference vector no. 1.
Figure 10:
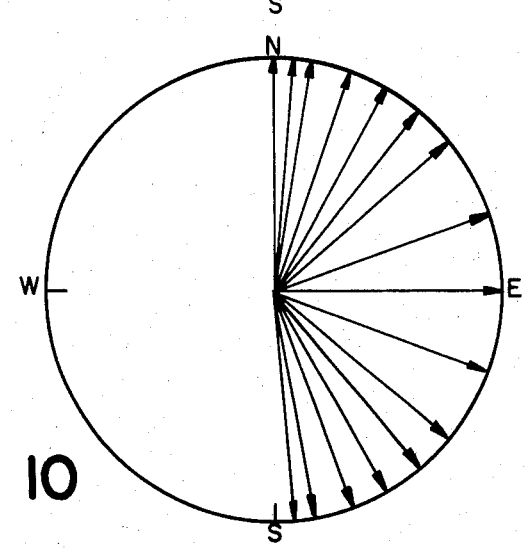
FIG. 10 shows the original unit vectors of another example.

The half-axes associated with reference vector number 1 are then converted into vectors as shown in FIG. 9. Conventional vector averaging procedures are applied and the magnitude of the resultant vector associated with reference vector number 1 is determined.

The process then chooses the original vector defined by $\theta_2$ and $\phi_2$ as reference vector number 2 and repeates the same operations as performed with reference vector number 1. The magnitude of the resultant vector associated with reference vector number 2 is then determined.

This procedure is continued until all original vectors have been used as reference vectors. Table 1 below lists the components and magnitude of the resultant vector associated with each reference vector for the case under consideration.

TABLE I

| REFERENCE VECTOR | RESULTANT VECTOR | | | |
|---|---|---|---|---|
| | X-COMPONENT | Y-COMPONENT | Z-COMPONENT | MAGNITUDE |
| 1 | 0.000 | 12.075 | 0.000 | 12.075 |

TABLE I-continued

| REFERENCE VECTOR | RESULTANT VECTOR | | | |
|---|---|---|---|---|
| | X-COMPONENT | Y-COMPONENT | Z-COMPONENT | MAGNITUDE |
| 2 | 0.000 | 12.075 | 0.000 | 12.075 |
| 3 | 0.000 | 12.075 | 0.000 | 12.075 |
| 4 | 0.939 | 11.733 | 0.000 | 11.770 |
| 5 | 1.879 | 11.391 | 0.000 | 11.545 |
| 6 | 2.645 | 10.748 | 0.000 | 11.069 |
| 7 | 4.054 | 9.339 | 0.000 | 10.181 |
| 8 | 6.039 | 5.901 | 0.000 | 8.443 |
| 9 | 6.039 | −5.901 | 0.000 | 8.443 |
| 10 | 4.054 | −9.339 | 0.000 | 10.181 |
| 11 | 2.645 | −10.748 | 0.000 | 11.069 |
| 12 | 1.879 | −11.391 | 0.000 | 11.545 |
| 13 | 0.939 | −11.733 | 0.000 | 11.770 |
| 14 | 0.000 | −12.075 | 0.000 | 12.075 |
| 15 | 0.000 | −12.075 | 0.000 | 12.075 |

The direction of the resultant vector exhibiting the greatest magnitude is then chosen as the preferred orientation solution to the problem. Note that Table I lists five resultant vectors with the same maximum magnitude of 12.075. Those associated with reference vectors 1, 2, and 3 describe a preferred orientation in the positive Y-direction or a dip of 0° and an azimuth of 0° (due north). But those corresponding to reference vectors 14 and 15 produce a preferred orientation result in the negative Y-direction or a dip of 0° and an azimuth of 180° (due south). However, both of these solutions are equivalent. The bi-modal nature of the azimuth is due to the two dimensional properties of the example problem. In the general three dimensional case, if the resultant dip (other than 0°) is taken as positive downward from the horizontal and the direction of the azimuth is associated with positive dip, then the bi-modal influence disappears and the azimuth solution is unique.

Figure 11:
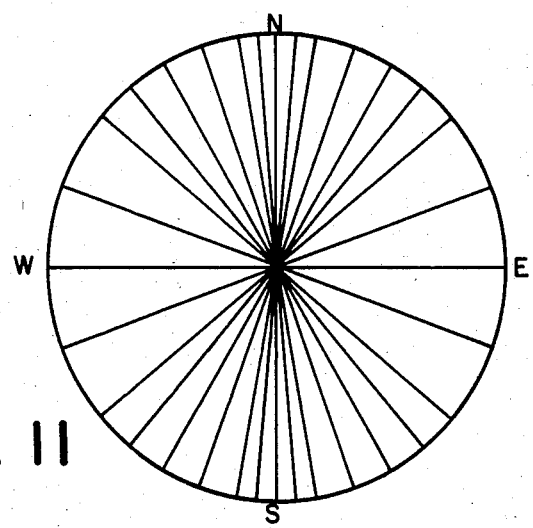
FIG. 11 shows the axes representation of FIG. 10.
Figure 12:
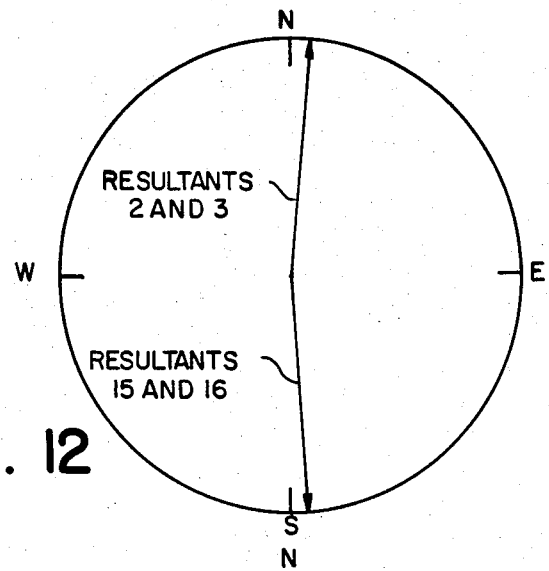
FIG. 12 shows the resultant vectors with identical magnitudes equal to the maximum value.

In accordance with an important aspect of the invention, special cases are resolved in a manner which determines preferred orientation. Under certain circumstances it is possible to obtain more than one resultant vector with the same maximum magnitude, and with none of these resultants, a solution to the preferred orientation problem. This can be demonstrated by adding an original vector oriented due east (azimuth=90°) to the previous example and obtaining FIG. 10. The axes representation for the problem as presented in FIG. 11 shows that the preferred orientation is again north-south. If the same procedure as above is followed, Table I is replaced by Table II below.

TABLE II

| REFERENCE VECTOR | RESULTANT VECTOR | | | |
|---|---|---|---|---|
| | X-COMPONENT | Y-COMPONENT | Z-COMPONENT | MAGNITUDE |
| 1 | 0.000 | 12.075 | 0.000 | 12.075 |
| 2 | 1.000 | 12.075 | 0.000 | 12.116 |
| 3 | 1.000 | 12.075 | 0.000 | 12.116 |
| 4 | 1.939 | 11.733 | 0.000 | 11.892 |
| 5 | 2.879 | 11.391 | 0.000 | 11.749 |
| 6 | 3.645 | 10.748 | 0.000 | 11.349 |
| 7 | 5.054 | 9.339 | 0.000 | 10.619 |
| 8 | 7.039 | 5.901 | 0.000 | 9.185 |
| 9 | 7.902 | 0.000 | 0.000 | 7.902 |
| 10 | 7.039 | −5.901 | 0.000 | 9.185 |
| 11 | 5.054 | −9.339 | 0.000 | 10.619 |
| 12 | 3.645 | −10.748 | 0.000 | 11.349 |
| 13 | 2.879 | −11.391 | 0.000 | 11.749 |
| 14 | 1.939 | −11.733 | 0.000 | 11.892 |
| 15 | 1.000 | −12.075 | 0.000 | 12.116 |
| 16 | 1.000 | −12.075 | 0.000 | 12.116 |

In this Table, the maximum magnitude of the resultant vectors is 12.116 and is shared by the resultants associated with reference vectors 2, 3, 15, and 16. Those corresponding to reference vectors 2 and 3 describe a preferred orientation with a dip of 0° and an azimuth of 4.73° (or 184.73°). The resultants listed with reference vectors 15 and 16 produce a dip of 0° and an azimuth of 175.27° (or 355.27°). We already have seen from inspection of FIG. 11 that the preferred orientation should be in a north-south direction. Therefore, none of the resultants obtained provide the preferred orientation solution for this example.

Figure 13:
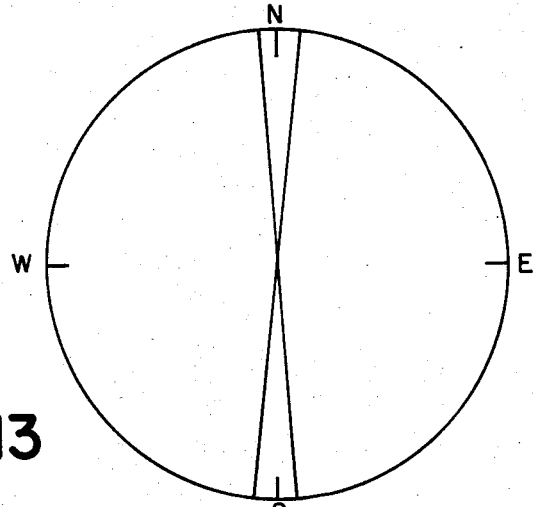
FIG. 13 shows the axes representation of FIG. 12.

In such a situation, the present invention performs extended steps to determine the correct preferred orientation. At the point where more than one maximum magnitude resultant vector is obtained, the program temporarily takes these resultants and treats them as original unit vectors. In the case under consideration, the problem then becomes that illustrated in FIG. 12. The axes representation is then obtained as shown in FIG. 13 and the resultant vector is determined to be defined by $\phi=90°$ and $\theta=0°$ (or 180°).

Figure 14:
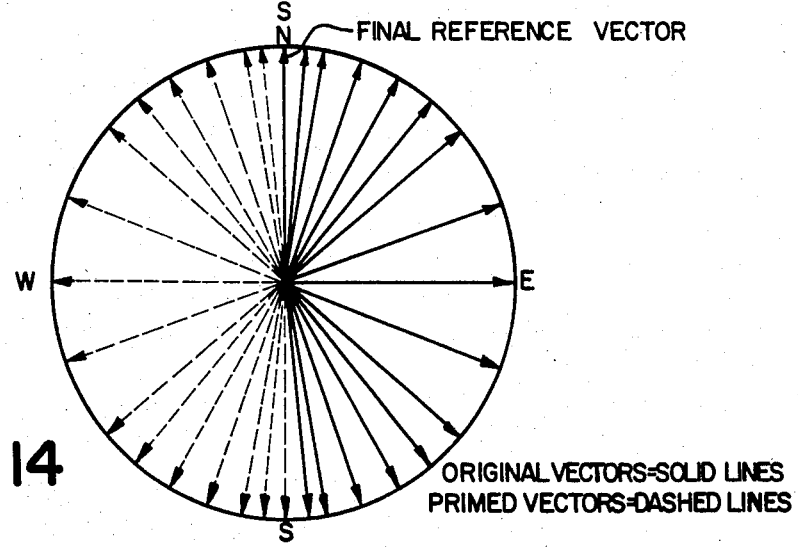
FIG. 14 shows the original vectors, primed vectors, and final reference vector associated with FIG. 10.
Figure 15:
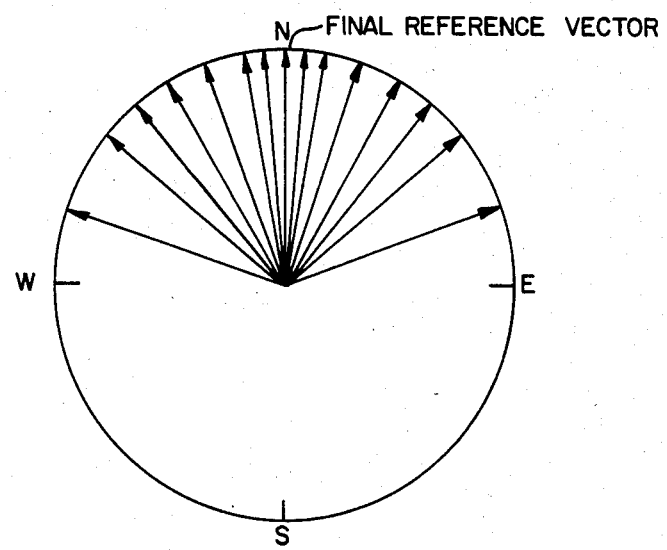
FIG. 15 shows the vectors associated with the final reference vector of the second example with conventional dipmeter measurements on the left and plots of the preferred orientation analysis of the present invention on the right.

The invention then uses this resultant vector as a final single reference unit vector along with all original vectors and primed vectors as illustrated in FIG. 14. The vector representation of the half-axes associated with the final reference vector (FIG. 15) is obtained and conventional vector averaging techniques produce the correct preferred orientation solution to this problem with dip=0° and azimuth=0°.

The invention can be carried out with a general purpose digital computer which performs the steps shown in the flow sheet of FIGS. 2, 2A and 2B. An exemplary program listing is given in the Appendix. FIG. 2 depicts the main program. The step 20 reads in a plurality of measurement results for a particular depth, such as the fifteen values of dip and azimuth depicted as vectors in FIG. 3. These original vectors are extended backwards, as indicated at 22, to produce the vector shown in FIG. 6 and the lineations shown in FIG. 7.

As indicated at 24 in FIG. 2, the subroutine VECMAX1 is called. This subroutine returns the rectangular components and magnitude of the resultant vector which has the maximum magnitude along with a value of KEY2. If more than one resultant has the same identical maximum magnitude, subroutine REFVEC and subroutine VECMAX2 are used along with subroutine VECMAX1.

The step 26 determines if there is a preferred dip orientation. If KEY2 is not equal to 0, there is no preferred dip and azimuth and the program terminates with an appropriate message. If there is a preferred dip and azimuth, the components of the preferred orientation are determined as indicated at 28.

If the azimuth for the preferred orientation vector is indeterminate, no final solution is possible and the program terminates with an appropriate message as indicated at 30.

Step 32 is a call for subroutine DISPER which will be subsequently discussed.

FIG. 2A depicts subroutine VECMAX1 which selects each vector as a reference and determines the magnitude of the resultant. Step 34 chooses the reference vector as previously depicted with regard to FIG. 8. The steps between 34 and 36 in FIG. 2A determine the magnitude of the resultant vector associated with the reference vector of FIGS. 8 and 9. As indicated at 38 these steps are repeated using each original vector as a reference vector. The resultant vector which has the maximum magnitude is determined as indicated at 40.

The special case where more than one resultant vector has the same maximum magnitude is dealt with by the subroutines called in step 42. As indicated at 44, the subroutine returns to the main program with the rectangular components and magnitude of the resultant vector which has the maximum magnitude along with a value of KEY2.

FIG. 2B is a flow chart of subroutine REFVEC. Step 46 determines how many resultant vectors have the same maximum magnitude and it determines their components.

Step 48 determines the orientations of the maximum magnitude resultant vectors in terms of angles. Step 50 obtains these angles for the associated primed vectors.

As indicated at 52, subroutine VECMAX2 is called. This uses the maximum magnitude resultant vectors and their primed counterparts in the same manner as the original vectors and primed vectors in subroutine VECMAX1 to determine a final single maximum magnitude resultant vector and a value KEY2. This is used as the final reference vector.

The step 54 obtains the angles for the final reference vector. There is a return to subroutine VECMAX1 with the angles for the final reference vector along with the value of KEY2. Subroutine VECMAX2 is essentially the same as subroutine VECMAX1 without the call for subroutine REFVEC. It uses the maximum magnitude resultant vectors and their primed counterparts in the same manner as original vectors and primed vectors in subroutine VECMAX1 to determine a final single reference vector and a value for KEY2. Return is made to subroutine REFVEC.

Subroutine DISPER performs a dispersion analysis on the group of lineations to determine how good an estimate has been obtained. The computer program listed in the Appendix contains a dispersion analysis based on the work of Fisher, R. A., "Dispersion on a Sphere", Proc. Roy. Soc., London, Ser. A, Vol. 217, (1953), pp. 295-306. The dispersion analysis results are included in the printout from the program and the nomenclature is provided in the Appendices.

FIGS. 16-20 depict results obtained with the present invention practiced on dipmeter measurements of an actual well. FIGS. 16-19 depict the measurement results performed only on an interval of the well between 5,900 feet and 6,040 feet. As previously indicated, the left hand side of these figures shows the display of these measurements by prior art technique without using any averaging or determination of preferred orientation. The measurements are plotted to represent dip magnitude as a function of depth. The dip magnitude scale at the top ranges from 0° to 70° dip. The straight line originating at the center of each solid circle represents the azimuth of the true dip and is analogous to the north-seeking end of a compass needle. In these plots, north is taken in the upward direction.

Figure 16:
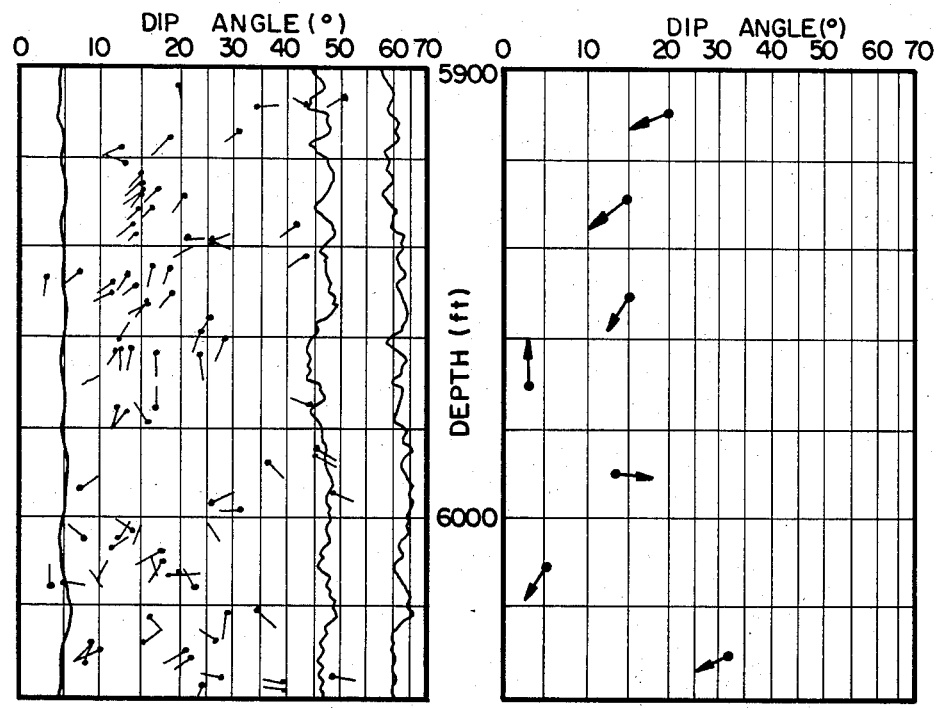

FIG. 16 illustrates the results obtained when the three-dimensional axes analysis of the present invention is applied to each of the seven 20' intervals which are shown. These are plotted to the right of the conventional plots. This interval by interval analysis using the invention eliminates much of the overall scatter of the original tadpole plot and suggests that certain combinations of intervals represent continuity while others indicate change.

FIG. 17 includes the results of the conventional vector averaging procedure (CVAP) (without arrowheads) along with those from the invention (with arrowheads). Many of the azimuths determined by the CVAP tend to parallel those obtained from the invention, but the dips vary widely and are greater in magnitude in almost every case. Dips greater than 70° are plotted as 70°.

Figure 18:
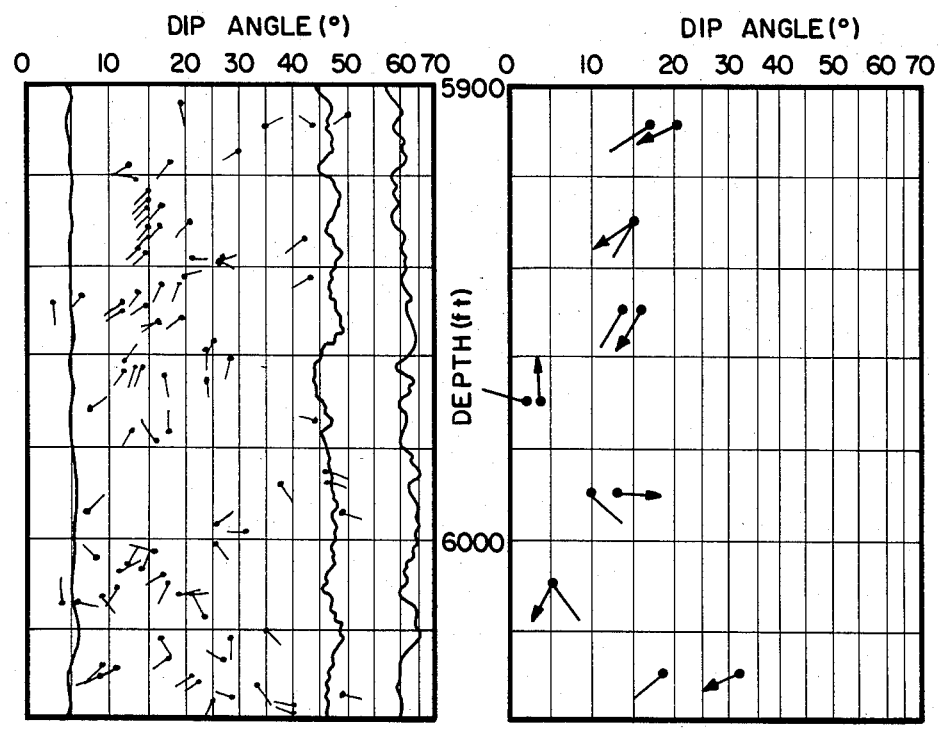
FIG. 18 is similar and additionally shows the results of a conventional pole averaging procedure.

FIG. 18 compares the conventional pole averaging procedure (CPAP) with the results of the present invention. Here again, the tadpoles with arrowheads represent the dips and azimuths as determined by the invention. In these plots, it appears that the two techniques produce azimuths that are more or less comparable, but the dips tend to be lower for the CPAP than the results of the invention for most intervals.

Figure 19:
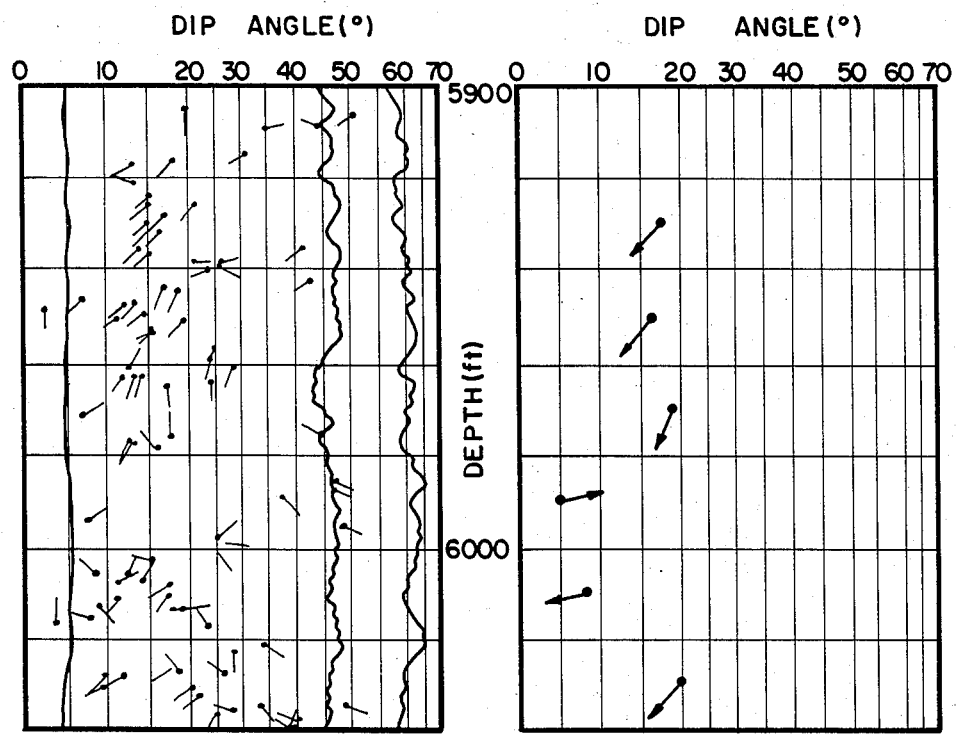
FIG. 19 shows an output plot produced with a 60-foot moving window to which the process of the present invention has been applied.

Another approach to analyzing dipmeter data is to use three-dimensional axes analysis along with a moving window. For this, let us use a 60' interval and a 20' step increment. This means that we apply the process of the invention over a 60' interval. If this is done, the plot of FIG. 19 is produced.

Figure 20:
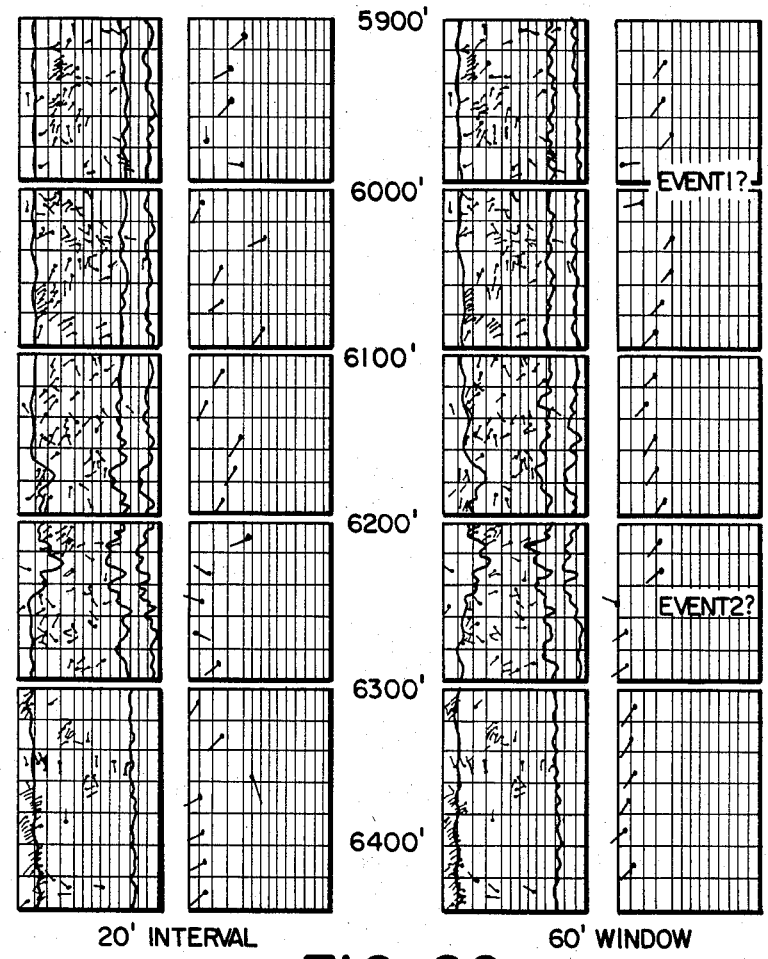
FIG. 20 shows output plots produced by the present invention applied to 20-foot intervals and to a 60-foot moving window.

FIG. 20 is a condensed version of the total length of the well which was logged. In this figure, the continuity of azimuth and dip is impressive, particularly where this continuity carries straight through sections that appear to be poorly oriented on the original plot. It illustrates the differences in results obtained when the invention is used for interval by interval analysis and when the moving window technique is used. Both representations have their own advantages.

The moving window results suggest two major events. One of these occurs in the vicinity of 6,000' and the other apparently at 6,240'. The latter event demonstrates an abrupt and permanent change in dip on the order of 10°. The first event is comparable in magnitude but apparently not permanent since the appearance of the plot is quite similar above and below this event.

Figure 21:
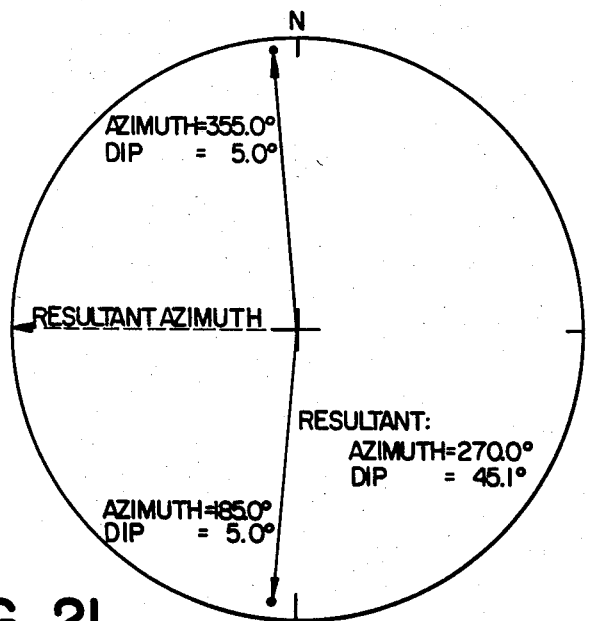
FIG. 21 depicts conventional vector averaging on a simple example.

In order to further demonstrate the usefulness of the invention, the procedure of the present invention is compared with commonly used vector averaging techniques. FIG. 21 illustrates the conventional vector averaging procedure, referred to as CVAP. Here, the vectors lie on the dipping planes, point in the direction of the dip, and are plotted on the projection of the lower hemisphere. If vector averaging is applied to these vectors, the resultant vector obtained is:
Resultant:
Azimuth=270.0°
Dip=45.1°

Figure 22:
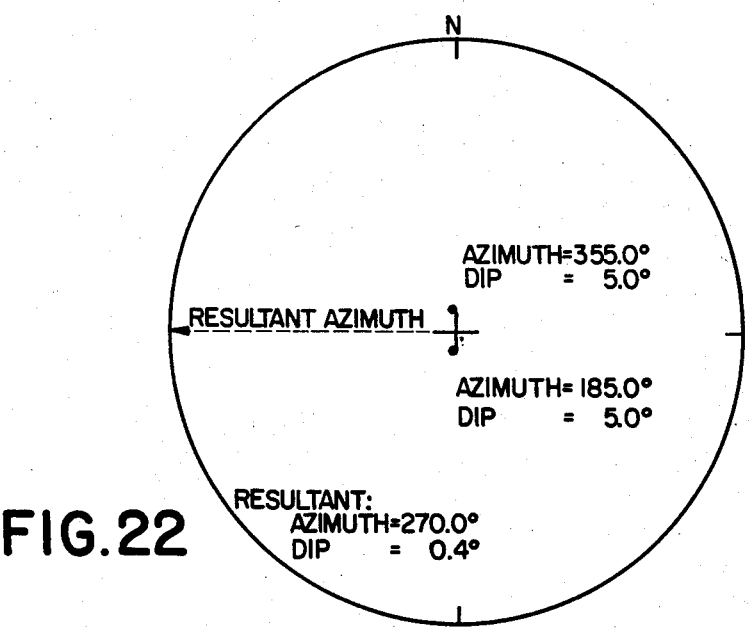
FIG. 22 depicts conventional pole averaging.

FIG. 22 illustrates the use of poles for the same problem. Here, the poles or normals to the dipping planes are plotted on the projection of the upper hemisphere.

It should be pointed out that a pole is also the representation of a dip vector that has been rotated 90° upwards in the vertical plane containing the dip vector. Except for a dip of exactly 90°, all such rotations will result in vectors confined to the upper hemisphere where the dip angle is then given by the angle between the pole vector and the vertical axis of the coordinate system.

If vector averaging is applied to the poles shown in FIG. 22, the resultant pole vector obtained is:
Resultant:
Azimuth=270.0°
Dip=0.4°

This procedure where the poles to the dipping planes are used is referred to herein as the conventional pole averaging procedure or CPAP.

Upon inspection of the results of the two commonly used averaging procedures as applied above to a simple example, it is obvious that something is wrong. One resultant dip is 45.1° while the other is only 0.4°, a difference of two orders of magnitude. The azimuths are identical in this example, but it can be shown that in many cases, they will not be so. Actually, neither of these results are valid. Application of the procedure of the present invention demonstrates that the correct resultant vector should be:
Resultant:
Azimuth=0.0° (or 180.0°)
Dip=0.0°

Figure 23:
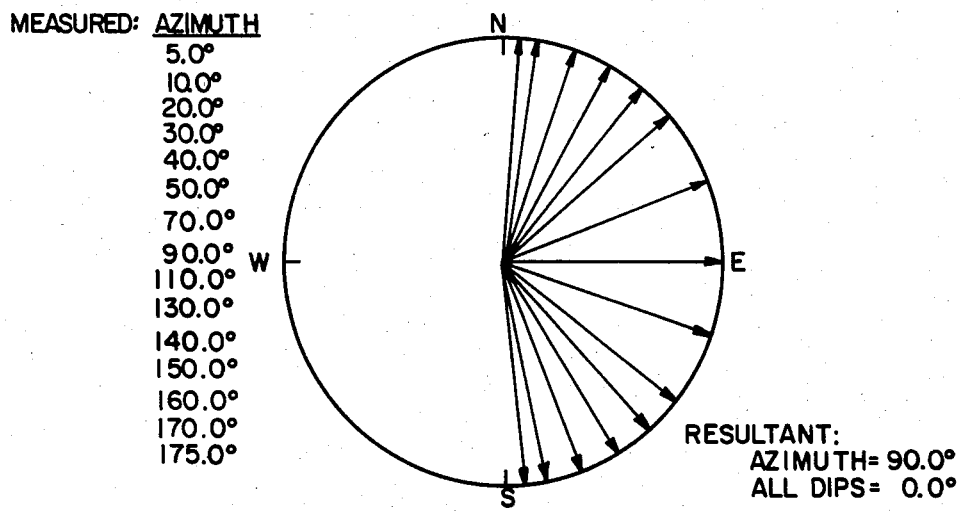
FIG. 23 depicts the preferred azimuth orientation on another example with conventional vector averaging.

Consider the azimuth orientation example illustrated in FIG. 23. Since this is an azimuth problem (i.e., all dips are zero), imagine the vectors shown as lying on a flat horizontal surface. Visual inspection suggests that, due to symmetry and location of the vectors, the preferred resultant azimuth is due east. This is actually found to be the result if the conventional vector averaging procedure (CVAP) is applied to this example. The conventional pole averaging procedure (CPAP) is useless in this case since the resultant azimuth is indeterminate.

Figure 24:
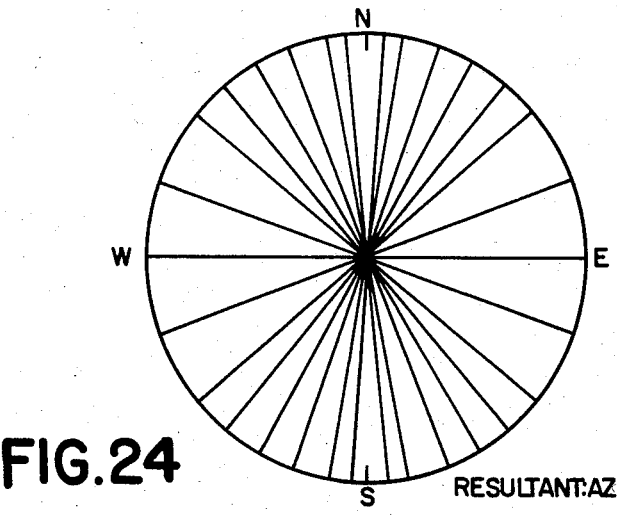
FIG. 24 shows the preferred azimuth orientation on the same problem with the axes representation of FIG. 23.

FIG. 24 is the axes representation for this same problem. This illustrates a preferred north-south orientation of axes and an east-west symmetry plane. Axes analysis demonstrates that this is true.

Therefore, for this example, the correct preferred azimuth as obtained by axes analysis is either 0° or 180° and not 90° as calculated using the conventional vector averaging procedure. In other words, the CVAP resultant is in error by 90°.

While a particular embodiment of the invention has been shown and described, various modifications are within the true spirit and scope of the invention. The appended claims, therefore, are intended to cover such modifications.

APPENDIX
ANNOTATED LISTING OF COMPUTER PROGRAM TRUDIP

```
100=      PROGRAM TRUDIP (INPUT,OUTPUT)
110=      DIMENSION DIP(200),AZM(200),TITLE(17)
120=      COMMON /A/ PHI(200),PHIP(200),THET(200),THETP(200),
130=     1AN(200),RFX(200),RFY(200),RFZ(200),RFXYZ(200),THETT(200),
140=     2THEPT(200),PHIT(200),PHIPT(200)
150=    1 FORMAT(I4,17A4)
160=    2 FORMAT(1H1,28X,*PROGRAM TRUDIP*,/,29X,*---------------*,//,
170=     11IX,*ANALYSIS AND PROGRAMMING -D.C.UHRI- DECEMBER    *,/,
180=     211X,*----------------------------------------------*,//,
190=     31X,*MOBIL RESEARCH AND DEVELOPMENT CORPORATION - FIELD *,
200=     4*RESEARCH LABORATORY*,/,1X,*----------------------------*
210=     5*--------------------------------*,////)
220=    3 FORMAT(2X,17A4,////)
230=    4 FORMAT(5X,*INPUT DATA*,13X,*AZIMUTH*,5X,*DIP*,
240=     1/,5X,*----------*,13X,*-------*,5X,*---*, //)
250=    5 FORMAT(2F5.1)
260=    6 FORMAT(29X,F5.1,4X,F5.1 )
270=    7 FORMAT(///,5X,*CALCULATED RESULTS*,2X,*RX    = *,E13.7,/,
280=     15X,*------------------*,2X,*RY    = *,E13.7,/,25X,
290=     2*RZ    = *,E13.7,/,25X,*RXY   = *,E13.7,/,25X,*RXYZ  = *,
300=     3E13.7)
310=    8 FORMAT(25X,*THETA = *,E13.7,/,25X,*PHI   = *,E13.7,/,25X,
320=     1*N    =*,11X,13,/,25X,*K     = *,E13.7,/,25X,*THECO = *,
330=     2E13.7,/,25X,*THEAZ = *,E13.7,/////)
```

```
340=     9 FORMAT( ///,2X,*RUN TERMINATED - NO FINAL SOLUTION *
350=       1*POSSIBLE FOR INPUT DATA PROVIDED*,/////)
360=    10 FORMAT( ///,4X,*THETA = 99999.0 INDICATES THAT THETA *
370=       1*IS INDETERMINATE*,/////)
380=    11 FORMAT( ///,4X,*SINCE PHI=90 DEGREES, THE AZIMUTH SHOWN *
390=       1*ABOVE IS BI-MODAL*,/,4X,*180 DEGREES MAY BE ADDED TO*
400=       2* OR SUBTRACTED FROM THIS VALUE*,/////)
410=    12 FORMAT( ///,23X,*NO PREFERRED AZIMUTH AND DIP*,/////)
420=
430=C      READ INPUT DATA
440=       READ 1, N,TITLE
450=       I=1
460=    20 READ 5, XX,YY
470=       AZM(I)=XX
480=       DIP(I)=YY
490=       IF(I.EQ.N) GO TO 21
500=       I=I+1
510=       GO TO 20
520=
530=C      PRINT HEADINGS AND TITLE
540=    21 WRITE 2
550=       WRITE 3, TITLE
560=       WRITE 4
570=
580=C      PRINT INPUT AZIMUTHS AND DIPS
590=       DO 22  I=1,N
600=       XX=AZM(I)
610=       YY=DIP(I)
620=       WRITE 6, XX,YY
630=    22 CONTINUE
640=       X=-1.0
650=       PI=ACOS(X)
660=
670=C      CON USED TO CONVERT DEGREES TO RADIANS
680=       CON=PI/180.0
690=       DO 23  I=1,N
700=
710=C      EXPRESS DIP OF ORIGINAL VECTOR IN TERMS OF ANGLE PHI
720=C         MEASURED DOWN FROM VERTICAL
730=       PHI(I)=(90.0+DIP(I))*CON
740=       THET(I)=AZM(I)*CON
750=
760=C      EXTEND ORIGINAL VECTORS BACKWARDS THROUGH UNIT SPHERE
770=C         TO CREATE PRIMED VECTORS
780=       PHIP(I)=(90.0-DIP(I))*CON
790=       THETP(I)=(AZM(I)+180.0)*CON
800=    23 CONTINUE
810=       CALL VECMAX1 (N,RXM,RYM,RZM,RXYZM,KEY2)
820=
830=C      IF KEY2 NOT EQUAL TO 0,THERE IS NO PREFERRED AZIMUTH
840=C         AND DIP
850=       IF(KEY2.EQ.0) GO TO 19
860=       WRITE 12
870=       GO TO 47
880=
890=C      DETERMINE COMPONENTS OF FINAL PREFERRED ORIENTATION
900=C         VECTOR IN TERMS OF PHI AND THETA
910=    19 RX=RXM
920=       RY=RYM
930=       RZ=RZM
940=       RXYZ=RXYZM
950=       IF(RY)24,25,29
960=    24 TXYZ=ATAN(RX/RY)+PI
```

```
970=         GO TO 30
980=      25 IF(RX)26,27,28
990=      26 TXYZ=-PI/2.0
1000=        GO TO 30
1010=     27 TXYZ=99999.0
1020=        GO TO 30
1030=     28 TXYZ=PI/2.0
1040=        GO TO 30
1050=     29 TXYZ=ATAN(RX/RY)
1060=     30 IF(RX.NE.0.0) GO TO 31
1070=        RXY1=0.0
1080=        GO TO 32
1090=     31 RXY1=RX*RX
1100=     32 IF(RY.NE.0.0) GO TO 33
1110=        RXY2=0.0
1120=        GO TO 34
1130=     33 RXY2=RY*RY
1140=     34 RXYT=RXY1+RXY2
1150=        IF(RXYT.NE.0.0) GO TO 35
1160=        RXY=0.0
1170=        GO TO 36
1180=     35 RXY=SQRT(RXYT)
1190=     36 IF(RZ)37,38,41
1200=     37 PXYZ=ATAN(RXY/RZ)+PI
1210=        GO TO 42
1220=     38 IF(RXY)39,39,40
1230=     39 PXYZ=99999.0
1240=        GO TO 42
1250=     40 PXYZ=PI/2.0
1260=        GO TO 42
1270=     41 PXYZ=ATAN(RXY/RZ)
1280=
1290=C       PRINT RECTANGULAR COMPONENTS AND MAGNITUDE OF FINAL
1300=C          PREFERRED ORIENTATION VECTOR
1310=     42 WRITE 7, RX,RY,RZ,RXY,RXYZ
1320=        IF(PXYZ.NE.99999.0) GO TO 43
1330=        WRITE 9
1340=        GO TO 47
1350=
1360=C       SUBROUTINE DISPER DETERMINES THE PRECISION PARAMETER
1370=C          AND SPHERICAL AND AZIMUTHAL HALF-ANGLES OF CONFIDENCE
1380=C          ASSOCIATED WITH THE PREFERRED ORIENTATION VECTOR
1390=     43 CALL DISPER(N,RXYZ,PXYZ,XK,THECO,THEAZ)
1400=
1410=C       CONVERT ALL RADIAN ANGLES TO DEGREES
1420=        IF(TXYZ.NE.99999.0) GO TO 44
1430=        GO TO 45
1440=     44 TXYZ=TXYZ/CON
1450=        IF(TXYZ.LT.0.0) TXYZ=TXYZ+360.0
1460=     45 PXYZ=PXYZ/CON
1470=        THECO=THECO/CON
1480=        THEAZ=THEAZ/CON
1490=
1500=C       PRINT THETA AND PHI ANGLES FOR PREFERRED ORIENTATION
1510=C          VECTOR, NUMBER OF VECTORS IN CALCULATION, PRECISION
1520=C          PARAMETER, AND SPHERICAL AND AZIMUTHAL HALF-ANGLES
1530=C          OF CONFIDENCE
1540=        WRITE 8, TXYZ,PXYZ,N,XK,THECO,THEAZ
1550=        IF(TXYZ.NE.99999.0) GO TO 46
1560=        WRITE 10
1570=     46 XX=PXYZ*(1.0 E+6)
1580=        LX=XX
1590=        XX=LX
```

```
1600=       XX=XX/(1.0 E+6)
1610=       IF(XX.NE.90.0) GO TO 47
1620=       WRITE 11
1630=    47 A=1.0
1640=       END
1650=
1660=C      SUBROUTINE VECMAX1 DETERMINES THE MAGNITUDE AND
1670=C         RECTANGULAR COMPONENTS OF THE PREFERRED ORIENTATION
1680=C         VECTOR
1690=       SUBROUTINE VECMAX1 (N,RXM,RYM,RZM,RXYZM,KEY2)
1700=       DIMENSION THETR(200),PHIR(200)
1710=       COMMON /A/  PHI(200),PHIP(200),THET(200),THETP(200),
1720=      1AN(200),RFX(200),RFY(200),RFZ(200),RFXYZ(200),THETT(200),
1730=      2THEPT(200),PHIT(200),PHIPT(200)
1740=       ACC=1.0 E-6
1750=       X=-1.0
1760=       PI=ACOS(X)
1770=       KEY1=0
1780=       KEY2=0
1790=       DO 8 I=1,N
1800=       AN(I)=0.0
1810=     8 CONTINUE
1820=
1830=C      CHOOSE ORIGINAL VECTOR DEFINED BY PHI(1) AND THETA(1)
1840=C         AS A REFERENCE VECTOR
1850=       J=1
1860=    10 AX=THET(J)
1870=       THETR(J)=AX
1880=       BX=PHI(J)
1890=       PHIR(J)=BX
1900=    11 A=THETR(J)
1910=       B=PHIR(J)
1920=
1930=C      DETERMINE SINE AND COSINE VALUES FOR CALCULATING
1940=C         REFERENCE VECTOR RECTANGULAR COMPONENTS
1950=       STR=SIN(A)
1960=       CTR=COS(A)
1970=       SPR=SIN(B)
1980=       CPR=COS(B)
1990=
2000=C      DETERMINE X-COMPONENT OF REFERENCE VECTOR
2010=       IF(STR.NE.0.0) GO TO 12
2020=       RRX=0.0
2030=       GO TO 14
2040=    12 RRX=STR*SPR
2050=       RRXA=ABS(RRX)
2060=       IF(RRXA.LE.ACC) RRX=0.0
2070=
2080=C      DETERMINE Y-COMPONENT OF REFERENCE VECTOR
2090=    14 IF(CTR.NE.0.0) GO TO 16
2100=       RRY=0.0
2110=       GO TO 18
2120=    16 RRY=CTR*SPR
2130=       RRYA=ABS(RRY)
2140=       IF(RRYA.LE.ACC) RRY=0.0
2150=
2160=C      DETERMINE Z-COMPONENT OF REFERENCE VECTOR
2170=    18 RRZ=CPR
2180=       RRZA=ABS(RRZ)
2190=       IF(RRZA.LE.ACC) RRZ=0.0
2200=       SUMRX=0.0
2210=       SUMRY=0.0
2220=       SUMRZ=0.0
2230=       DO 70 I=1,N
```

```
2240=
2250=C       DETERMINE SINE AND COSINE VALUES FOR CALCULATING
2260=C         ORIGINAL AND PRIMED VECTOR RECTANGULAR COMPONENTS
2270=        A=THET(I)
2280=        B=THETP(I)
2290=        C=PHI(I)
2300=        D=PHIP(I)
2310=        ST=SIN(A)
2320=        CT=COS(A)
2330=        STP=SIN(B)
2340=        CTP=COS(B)
2350=        SP=SIN(C)
2360=        CP=COS(C)
2370=        SPP=SIN(D)
2380=        CPP=COS(D)
2390=
2400=C       DETERMINE X-COMPONENT OF ORIGINAL VECTOR
2410=        IF(ST.NE.0.0) GO TO 20
2420=        RX=0.0
2430=        GO TO 22
2440=     20 RX=ST*SP
2450=        RXA=ABS(RX)
2460=        IF(RXA.LE.ACC) RX=0.0
2470=
2480=C       DETERMINE Y-COMPONENT OF ORIGINAL VECTOR
2490=     22 IF(CT.NE.0.0) GO TO 24
2500=        RY=0.0
2510=        GO TO 26
2520=     24 RY=CT*SP
2530=        RYA=ABS(RY)
2540=        IF(RYA.LE.ACC) RY=0.0
2550=
2560=C       DETERMINE Z-COMPONENT OF ORIGINAL VECTOR
2570=     26 RZ=CP
2580=        RZA=ABS(RZ)
2590=        IF(RZA.LE.ACC) RZ=0.0
2600=C       DETERMINE X-COMPONENT OF PRIMED VECTOR
2610=        IF(STP.NE.0.0) GO TO 28
2620=        RXP=0.0
2630=        GO TO 30
2640=     28 RXP=STP*SPP
2650=        RXPA=ABS(RXP)
2660=        IF(RXPA.LE.ACC) RXP=0.0
2670=
2680=C       DETERMINE Y-COMPONENT OF PRIMED VECTOR
2690=     30 IF(CTP.NE.0.0) GO TO 32
2700=        RYP=0.0
2710=        GO TO 34
2720=     32 RYP=CTP*SPP
2730=        RYPA=ABS(RYP)
2740=        IF(RYPA.LE.ACC) RYP=0.0
2750=
2760=C       DETERMINE Z-COMPONENT OF PRIMED VECTOR
2770=     34 RZP=CPP
2780=        RZPA=ABS(RZP)
2790=        IF(RZPA.LE.ACC) RZP=0.0
2800=
2810=C       CALCULATE DOT PRODUCT E BETWEEN REFERENCE VECTOR AND
2820=C         ORIGINAL VECTOR
2830=        IF(RRX.NE.0.0) GO TO 36
2840=        E1=0.0
2850=        GO TO 38
2860=     36 E1=RRX*RX
2870=     38 IF(RRY.NE.0.0) GO TO 40
```

```
2880=        E2=0.0
2890=        GO TO 42
2900=     40 E2=RRY*RY
2910=     42 IF(RRZ.NE.0.0) GO TO 44
2920=        E3=0.0
2930=        GO TO 46
2940=     44 E3=RRZ*RZ
2950=     46 E=E1+E2+E3
2960=        EA=ABS(E)
2970=        IF(EA.LE.ACC) E=0.0
2980=        EAP=ABS(E-PI)
2990=        IF(EAP.LE.ACC) E=PI
3000=
3010=C       CALCULATE DOT PRODUCT F BETWEEN REFERENCE VECTOR AND
3020=C          PRIMED VECTOR
3030=        IF(RRX.NE.0.0) GO TO 48
3040=        F1=0.0
3050=        GO TO 50
3060=     48 F1=RRX*RXP
3070=     50 IF(RRY.NE.0.0) GO TO 52
3080=        F2=0.0
3090=        GO TO 56
3100=     52 F2=RRY*RYP
3110=     56 IF(RRZ.NE.0.0) GO TO 58
3120=        F3=0.0
3130=        GO TO 60
3140=     58 F3=RRZ*RZP
3150=     60 F=F1+F2+F3
3160=        FA=ABS(F)
3170=        IF(FA.LE.ACC) F=0.0
3180=        FAP=ABS(F-PI)
3190=        IF(FAP.LE.ACC) F=PI
3200=
3210=C       DETERMINE ANGLE GAM BETWEEN REFERENCE VECTOR AND
3220=C          ORIGINAL VECTOR
3230=        GAM=ACOS(E)
3240=
3250=C       DETERMINE ANGLE GAMP BETWEEN REFERENCE VECTOR AND
3260=C          PRIMED VECTOR
3270=        GAMP=ACOS(F)
3280=        G=GAM-GAMP
3290=        IF(ABS(G).LT.ACC) G=0.0
3300=
3310=C       CHOOSE VECTOR (EITHER ORIGINAL OR PRIMED) THAT IS
3320=C          CLOSEST TO REFERENCE VECTOR AND DESIGNATE COMPONENTS
3330=C          AS BELONGING TO VECTOR RS
3340=        IF(G) 62,64,66
3350=     62 RSX=RX
3360=        RSY=RY
3370=        RSZ=RZ
3380=        GO TO 68
3390=     64 RSX=0.0
3400=        RSY=0.0
3410=        RSZ=0.0
3420=        GO TO 68
3430=     66 RSX=RXP
3440=        RSY=RYP
3450=        RSZ=RZP
3460=
3470=C       ADD COMPONENTS OF VECTOR CHOSEN (ORIGINAL OR PRIMED)
3480=C          AS CLOSEST TO REFERENCE VECTOR TO SUM OF COMPONENTS
3490=C          OF CLOSEST VECTORS
3500=     68 SUMRX=SUMRX+RSX
3510=        SUMRY=SUMRY+RSY
```

```
3520=      SUMRZ=SUMRZ+RSZ
3530=
3540=C     KEEPING SAME REFERENCE VECTOR, REPEAT PROCEDURE WITH
3550=C        NEXT ORIGINAL AND PRIMED VECTOR SET UNTIL N VECTOR
3560=C        SETS HAVE BEEN PROCESSED
3570=   70 CONTINUE
3580=      IF(ABS(SUMRX).LE.ACC) SUMRX=0.0
3590=      IF(ABS(SUMRY).LE.ACC) SUMRY=0.0
3600=      IF(ABS(SUMRZ).LE.ACC) SUMRZ=0.0
3610=      CHECK=SUMRX+SUMRY+SUMRZ
3620=
3630=C     DETERMINE MAGNITUDE AND COMPONENTS OF RESULTANT VECTOR
3640=C        RFXYZ ASSOCIATED WITH SUM OF VECTORS CLOSEST TO
3650=C        REFERENCE VECTOR UNDER CONSIDERATION
3660=      IF(CHECK.NE.0.0) GO TO 72
3670=      RFXYZ(J)=0.0
3680=      GO TO 74
3690=   72 RFXYZ(J)=SQRT(SUMRX*SUMRX+SUMRY*SUMRY+SUMRZ*SUMRZ)
3700=      XX=RFXYZ(J)*(1.0 E+9)
3710=      LX=XX
3720=      XX=LX
3730=      XX=XX/(1.0 E+9)
3740=      RFXYZ(J)=XX
3750=   74 RFX(J)=SUMRX
3760=      XX=RFX(J)*(1.0 E+9)
3770=      LX=XX
3780=      XX=LX
3790=      XX=XX/(1.0 E+9)
3800=      RFX(J)=XX
3810=      RFY(J)=SUMRY
3820=      XX=RFY(J)*(1.0 E+9)
3830=      LX=XX
3840=      XX=LX
3850=      XX=XX/(1.0 E+9)
3860=      RFY(J)=XX
3870=      RFZ(J)=SUMRZ
3880=      XX=RFZ(J)*(1.0 E+9)
3890=      LX=XX
3900=      XX=LX
3910=      XX=XX/(1.0 E+9)
3920=      RFZ(J)=XX
3930=      IF(J.EQ.N) GO TO 76
3940=      IF(KEY1.EQ.1) GO TO 76
3950=      J=J+1
3960=
3970=C     CHOOSE NEXT ORIGINAL VECTOR DEFINED BY PHI(J) AND
3980=C        THETA(J) AS REFERENCE VECTOR AND REPEAT PROCEDURE
3990=      GO TO 10
4000=
4010=C     FIND RESULTANT VECTOR RXYZM OF MAXIMUM MAGNITUDE THAT
4020=C        REPRESENTS THE PREFERRED ORIENTATION DIRECTION
4030=   76 KK=1
4040=      RXYZM=RFXYZ(1)
4050=      RXM=RFX(1)
4060=      RYM=RFY(1)
4070=      RZM=RFZ(1)
4080=      IF(KEY1.EQ.1) GO TO 82
4090=      DO 78  J=2,N
4100=      A=RFXYZ(J)
4110=      IF(RXYZM.GE.A) GO TO 78
4120=      RXYZM=RFXYZ(J)
4130=      RXM=RFX(J)
4140=      RYM=RFY(J)
4150=      RZM=RFZ(J)
```

```
4160=       KK=J
4170=   78  CONTINUE
4180=
4190=C      CHECK FOR MORE THAN ONE RESULTANT VECTOR HAVING
4200=C         IDENTICAL MAXIMUM MAGNITUDES
4210=       IF(KK.EQ.N) GO TO 82
4220=       AN(KK)=1.0
4230=       KP1=KK+1
4240=       DO 80 J=KP1,N
4250=       A=RFXYZ(J)
4260=       IF(RXYZM.NE.A) GO TO 80
4270=       KEY1=1
4280=
4290=C      AN(J) INDICATES WHICH RESULTANT VECTORS HAVE IDENTICAL
4300=C         MAXIMUM MAGNITUDES
4310=       AN(J)=1.0
4320=   80  CONTINUE
4330=
4340=C      IF MORE THAN ONE RESULTANT VECTOR HAS THE SAME MAXIMUM
4350=C         MAGNITUDE, CALCULATE APPROPRIATE REFERENCE VECTOR
4360=       IF(KEY1.EQ.0) GO TO 82
4370=       CALL REFVEC (N,AA,BB,KEY2)
4380=       IF(KEY2.EQ.1) GO TO 82
4390=       J=1
4400=       THETR(J)=AA
4410=       PHIR(J)=BB
4420=
4430=C      USING THIS CALCULATED REFERENCE VECTOR, DETERMINE THE
4440=C         RESULTANT VECTOR THAT REPRESENTS THE PREFERRED
4450=C         ORIENTATION DIRECTION
4460=       GO TO 11
4470=   82  ABC=1.0
4480=       RETURN
4490=       END
4500=
4510=C      SUBROUTINE REFVEC DETERMINES THE APPROPRIATE REFERENCE
4520=C         VECTOR THAT SHOULD BE USED WHEN MORE THAN ONE
4530=C         RESULTANT VECTOR OF MAXIMUM MAGNITUDE IS OBTAINED
4540=C         IN SUBROUTINE VECMAX1
4550=       SUBROUTINE REFVEC (N,AA,BB,KEY2)
4560=       COMMON /A/ PHI(200),PHIP(200),THET(200),THETP(200),
4570=      1AN(200),RFX(200),RFY(200),RFZ(200),RFXYZ(200),THETT(200),
4580=      2THEPT(200),PHIT(200),PHIPT(200)
4590=       KEY3=0
4600=       X=-1.0
4610=       PI=ACOS(X)
4620=       NT=0
4630=
4640=C      DETERMINE HOW MANY RESULTANT VECTORS HAVE THE SAME
4650=C         MAXIMUM MAGNITUDE AND CALCULATE THEIR COMPONENTS
4660=       DO 22 I=1,N
4670=       IF(AN(I).EQ.0.0) GO TO 22
4680=       NT=NT+1
4690=       A=RFX(I)
4700=       RFX(NT)=A
4710=       B=RFY(I)
4720=       RFY(NT)=B
4730=       C=RFZ(I)
4740=       RFZ(NT)=C
4750=   22  CONTINUE
4760=   23  DO 43 J=1,NT
4770=       RX=RFX(J)
4780=       RY=RFY(J)
```

```
4790=       RZ=RFZ(J)
4800=
4810=C      DETERMINE ORIENTATIONS OF MAXIMUM MAGNITUDE VECTORS
4820=C         IN TERMS OF ANGLES THETA AND PHI
4830=       IF(RY)24,25,29
4840=    24 TXYZ=ATAN(RX/RY)+PI
4850=       GO TO 30
4860=    25 IF(RX)26,27,28
4870=    26 TXYZ=-PI/2.0
4880=       GO TO 30
4890=    27 TXYZ=0.0
4900=       GO TO 30
4910=    28 TXYZ=PI/2.0
4920=       GO TO 30
4930=    29 TXYZ=ATAN(RX/RY)
4940=    30 IF(RX.NE.0.0) GO TO 31
4950=       RXY1=0.0
4960=       GO TO 32
4970=    31 RXY1=RX*RX
4980=    32 IF(RY.NE.0.0) GO TO 33
4990=       RXY2=0.0
5000=       GO TO 34
5010=    33 RXY2=RY*RY
5020=    34 RXYT=RXY1+RXY2
5030=       IF(RXYT.NE.0.0) GO TO 35
5040=       RXY=0.0
5050=       GO TO 36
5060=    35 RXY=SQRT(RXYT)
5070=    36 IF(RZ)37,38,41
5080=    37 PXYZ=ATAN(RXY/RZ)+PI
5090=       GO TO 42
5100=    38 IF(RXY)39,39,40
5110=    39 PXYZ=99999.0
5120=       GO TO 42
5130=    40 PXYZ=PI/2.0
5140=       GO TO 42
5150=    41 PXYZ=ATAN(RXY/RZ)
5160=    42 IF(KEY3.EQ.1) GO TO 44
5170=
5180=C      OBTAIN ANGLES THETA AND PHI FOR ASSOCIATED PRIMED
5190=C         VECTORS
5200=       THETT(J)=TXYZ
5210=       THEPT(J)=TXYZ+PI
5220=       PHIT(J)=PXYZ
5230=       PHIPT(J)=PI-PXYZ
5240=    43 CONTINUE
5250=
5260=C      USE SUBROUTINE VECMAX2 AND MAXIMUM MAGNITUDE VECTORS
5270=C         IN SAME MANNER AS ORIGINAL VECTORS WERE USED
5280=C         PREVIOUSLY IN SUBROUTINE VECMAX1 AND DETERMINE FINAL
5290=C         MAXIMUM MAGNITUDE RESULTANT VECTOR TO BE USED AS
5300=C         FINAL REFERENCE VECTOR
5310=       CALL VECMAX2 (NT,RXM,RYM,RZM,RXYZM,KEY2)
5320=       IF(KEY2.EQ.1) GO TO 45
5330=       J=1
5340=       NT=1
5350=       KEY3=1
5360=       RFX(1)=RXM
5370=       RFY(1)=RYM
5380=       RFZ(1)=RZM
5390=
5400=C      OBTAIN ANGLES THETA AND PHI FOR FINAL REFERENCE VECTOR
5410=       GO TO 23
```

```
5420=    44 AA=TXYZ
5430=       BB=PXYZ
5440=    45 ABC=1.0
5450=       RETURN
5460=       END
5470=
5480=C      SINCE SUBROUTINE VECMAX2 IS ESSENTIALLY IDENTICAL TO
5490=C         SUBROUTINE VECMAX1, NO FURTHER COMMENTS WIL BE MADE
5500=C         REGARDING SUBROUTINE VECMAX2
5510=       SUBROUTINE VECMAX2 (NT,RXM,RYM,RZM,RXYZM,KEY2)
5520=       DIMENSION THETX(200),PHIX(200)
5530=       COMMON /A/ PHI(200),PHIP(200),THET(200),THETP(200),
5540=      1AN(200),RFX(200),RFY(200),RFZ(200),RFXYZ(200),THETT(200),
5550=      2THEPT(200),PHIT(200),PHIPT(200)
5560=       ACC=1.0 E-6
5570=       X=-1.0
5580=       PI=ACOS(X)
5590=       KEY2=0
5600=       J=1
5610=    10 AX=THETT(J)
5620=       THETX(J)=AX
5630=       BX=PHIT(J)
5640=       PHIX(J)=BX
5650=       A=THETX(J)
5660=       B=PHIX(J)
5670=       STR=SIN(A)
5680=       CTR=COS(A)
5690=       SPR=SIN(B)
5700=       CPR=COS(B)
5710=       IF(STR.NE.0.0) GO TO 12
5720=       RRX=0.0
5730=       GO TO 14
5740=    12 RRX=STR*SPR
5750=       RRXA=ABS(RRX)
5760=       IF(RRXA.LE.ACC) RRX=0.0
5770=    14 IF(CTR.NE.0.0) GO TO 16
5780=       RRY=0.0
5790=       GO TO 18
5800=    16 RRY=CTR*SPR
5810=       RRYA=ABS(RRY)
5820=       IF(RRYA.LE.ACC) RRY=0.0
5830=    18 RRZ=CPR
5840=       RRZA=ABS(RRZ)
5850=       IF(RRZA.LE.ACC) RRZ=0.0
5860=       SUMRX=0.0
5870=       SUMRY=0.0
5880=       SUMRZ=0.0
5890=       DO 70 I=1,NT
5900=       A=THETT(I)
5910=       B=THEPT(I)
5920=       C=PHIT(I)
5930=       D=PHIPT(I)
5940=       ST=SIN(A)
5950=       CT=COS(A)
5960=       STP=SIN(B)
5970=       CTP=COS(B)
5980=       SP=SIN(C)
5990=       CP=COS(C)
6000=       SPP=SIN(D)
6010=       CPP=COS(D)
6020=       IF(ST.NE.0.0) GO TO 20
6030=       RX=0.0
6040=       GO TO 22
```

```
6050=    20 RX=ST*SP
6060=       RXA=ABS(RX)
6070=       IF(RXA.LE.ACC) RX=0.0
6080=    22 IF(CT.NE.0.0) GO TO 24
6090=       RY=0.0
6100=       GO TO 26
6110=    24 RY=CT*SP
6120=       RYA=ABS(RY)
6130=       IF(RYA.LE.ACC) RY=0.0
6140=    26 RZ=CP
6150=       RZA=ABS(RZ)
6160=       IF(RZA.LE.ACC) RZ=0.0
6170=       IF(STP.NE.0.0) GO TO 28
6180=       RXP=0.0
6190=       GO TO 30
6200=    28 RXP=STP*SPP
6210=       RXPA=ABS(RXP)
6220=       IF(RXPA.LE.ACC) RXP=0.0
6230=    30 IF(CTP.NE.0.0) GO TO 32
6240=       RYP=0.0
6250=       GO TO 34
6260=    32 RYP=CTP*SPP
6270=       RYPA=ABS(RYP)
6280=       IF(RYPA.LE.ACC) RYP=0.0
6290=    34 RZP=CPP
6300=       RZPA=ABS(RZP)
6310=       IF(RZPA.LE.ACC) RZP=0.0
6320=       IF(RRX.NE.0.0) GO TO 36
6330=       E1=0.0
6340=       GO TO 38
6350=    36 E1=RRX*RX
6360=    38 IF(RRY.NE.0.0) GO TO 40
6370=       E2=0.0
6380=       GO TO 42
6390=    40 E2=RRY*RY
6400=    42 IF(RRZ.NE.0.0) GO TO 44
6410=       E3=0.0
6420=       GO TO 46
6430=    44 E3=RRZ*RZ
6440=    46 E=E1+E2+E3
6450=       EA=ABS(E)
6460=       IF(EA.LE.ACC) E=0.0
6470=       EAP=ABS(E-PI)
6480=       IF(EAP.LE.ACC) E=PI
6490=       IF(RRX.NE.0.0) GO TO 48
6500=       F1=0.0
6510=       GO TO 50
6520=    48 F1=RRX*RXP
6530=    50 IF(RRY.NE.0.0) GO TO 52
6540=       F2=0.0
6550=       GO TO 56
6560=    52 F2=RRY*RYP
6570=    56 IF(RRZ.NE.0.0) GO TO 58
6580=       F3=0.0
6590=       GO TO 60
6600=    58 F3=RRZ*RZP
6610=    60 F=F1+F2+F3
6620=       FA=ABS(F)
6630=       IF(FA.LE.ACC) F=0.0
6640=       FAP=ABS(F-PI)
6650=       IF(FAP.LE.ACC) F=PI
6660=       GAM=ACOS(E)
6670=       GAMP=ACOS(F)
```

```
6680=        G=GAM-GAMP
6690=        IF(ABS(G).LT.ACC) G=0.0
6700=        IF(G) 62,64,66
6710=     62 RSX=RX
6720=        RSY=RY
6730=        RSZ=RZ
6740=        GO TO 68
6750=     64 RSX=0.0
6760=        RSY=0.0
6770=        RSZ=0.0
6780=        KEY2=1
6790=        GO TO 80
6800=     66 RSX=RXP
6810=        RSY=RYP
6820=        RSZ=RZP
6830=     68 SUMRX=SUMRX+RSX
6840=        SUMRY=SUMRY+RSY
6850=        SUMRZ=SUMRZ+RSZ
6860=     70 CONTINUE
6870=        IF(ABS(SUMRX).LE.ACC) SUMRX=0.0
6880=        IF(ABS(SUMRY).LE.ACC) SUMRY=0.0
6890=        IF(ABS(SUMRZ).LE.ACC) SUMRZ=0.0
6900=        CHECK=SUMRX+SUMRY+SUMRZ
6910=        IF(CHECK.NE.0.0) GO TO 72
6920=        RFXYZ(J)=0.0
6930=        GO TO 74
6940=     72 RFXYZ(J)=SQRT(SUMRX*SUMRX+SUMRY*SUMRY+SUMRZ*SUMRZ)
6950=        XX=RFXYZ(J)*(1.0 E+9)
6960=        LX=XX
6970=        XX=LX
6980=        XX=XX/(1.0 E+9)
6990=        RFXYZ(J)=XX
7000=     74 RFX(J)=SUMRX
7010=        XX=RFX(J)*(1.0 E+9)
7020=        LX=XX
7030=        XX=LX
7040=        XX=XX/(1.0 E+9)
7050=        RFX(J)=XX
7060=        RFY(J)=SUMRY
7070=        XX=RFY(J)*(1.0 E+9)
7080=        LX=XX
7090=        XX=LX
7100=        XX=XX/(1.0 E+9)
7110=        RFY(J)=XX
7120=        RFZ(J)=SUMRZ
7130=        XX=RFZ(J)*(1.0 E+9)
7140=        LX=XX
7150=        XX=LX
7160=        XX=XX/(1.0 E+9)
7170=        RFZ(J)=XX
7180=        IF(J.EQ.NT) GO TO 76
7190=        J=J+1
7200=        GO TO 10
7210=     76 RXYZM=RFXYZ(1)
7220=        RXM=RFX(1)
7230=        RYM=RFY(1)
7240=        RZM=RFZ(1)
7250=        DO 78 J=2,NT
7260=        A=RFXYZ(J)
7270=        IF(RXYZM.GE.A) GO TO 78
7280=        RXYZM=RFXYZ(J)
7290=        RXM=RFX(J)
7300=        RYM=RFY(J)
```

```
7310=       RZM=RFZ(J)
7320=    78 CONTINUE
7330=    80 ABC=1.0
7340=       RETURN
7350=       END
7360=
7370=C      SUBROUTINE DISPER USES FISHER'S STATISTICS FOR SPHERICAL
7380=C         NORMAL DISPERSION ON A SPHERE TO CALCULATE THE
7390=C         PRECISION PARAMETER AND SPHERICAL AND AZIMUTHAL
7400=C         HALF-ANGLES OF CONFIDENCE ASSOCIATED WITH THE
7410=C         PREFERRED ORIENTAION VECTOR
7420=       SUBROUTINE DISPER (N,R,PHI,XK,THECO,THEAZ)
7430=     1 FORMAT ( ///,8X,*MORE THAN 20 TERMS REQUIRED IN FISHER*
7440=      1* DISPERSION EQUATION*,//,28X,*CHECK INPUT DATA*,///)
7450=     2 FORMAT ( ///,4X,*NO CONVERGENCE OF SOLUTION FOR DISPERSION*
7460=      1* ANGLE COSINE "C" AFTER*,/,4X,*50 ITERATIONS ----- *
7470=      2*PROBABILITY "P" = *,E12.7,//)
7480=       ACC=1.0 E-5
7490=       P=0.05
7500=       XN=N
7510=       X=-1.0
7520=       PI=ACOS(X)
7530=
7540=C      DETERMINE TERMS IN EQUATION FOR SPHERICAL RADIUS OF
7550=C         CONE OF CONFIDENCE
7560=       A=XN-R
7570=       IF(A.EQ.0.0) A=1.0 E-20
7580=       B=1.0/(XN-1.0)
7590=       C=1.0-A/R*((1.0/P)**B-1.0)
7600=       D=XN-1.0
7610=       IF(A.LT.2.0) GO TO 28
7620=       DO 10  I=1,20
7630=
7640=C      DETERMINE S-VALUE IN GENERAL EQUATION FOR PROBABILITY
7650=       S=I
7660=       XA=2.0*S
7670=       XB=XA+2.0
7680=       IF(XA.LE.A.AND.A.LT.XB) GO TO 12
7690=    10 CONTINUE
7700=       WRITE 1
7710=    12 IS=S+0.001
7720=       XNFAC=1.0
7730=       N=XN+0.001
7740=C      CALCULATE N FACTORIAL
7750=       DO 14  M=1,N
7760=       XM=M
7770=       XNFAC=XNFAC*XM
7780=    14 CONTINUE
7790=
7800=C      CALCULATE C BY ITERATION
7810=       J=1
7820=       CU=1.0
7830=       CL=-1.0
7840=    16 C=(CU+CL)/2.0
7850=
7860=C      CALCULATE FIRST TERM IN GENERAL EQUATION FOR PROBABILITY
7870=       FXN=(A/(XN-R*C))**D
7880=
7890=C      CALCULATE REMAINING TERMS IN GENERAL EQUATION FOR
7900=C         PROBABILITY AND SUM ALL TERMS
7910=       DO 22  I=1,IS
7920=       S=I
7930=       L=I
```

```
7940=      XNMSF=1.0
7950=      SFAC=1.0
7960=
7970=C     CALCULATE S FACTORIAL
7980=      DO 18  M=1,L
7990=      XM=M
8000=      SFAC=SFAC*XM
8010=  18  CONTINUE
8020=      LL=XN-S+0.001
8030=C     CALCULATE N-S FACTORIAL
8040=      DO 20  M=1,LL
8050=      XM=M
8060=      XNMSF=XNMSF*XM
8070=  20  CONTINUE
8080=
8090=C     CALCULATE NUMERATOR AND DENOMINATOR FOR S+1 TERM AND
8100=C       ADD TO RUNNING SUMMATION
8110=      FNUM=(-1.0)**L*XNFAC*R*(1.0-C)*(A-2.0*S)**D
8120=      FDEN=XNMSF*SFAC*(XN-R*C)**D*(R-R*C+2.0*S)
8130=      FXN=FXN+FNUM/FDEN
8140=  22  CONTINUE
8150=      CHECK=ABS((FXN-P)/P)
8160=      IF(CHECK.LE.ACC) GO TO 28
8170=      IF(J.GE.50) GO TO 26
8180=      J=J+1
8190=      IF(FXN.LT.P) GO TO 24
8200=      CU=C
8210=      GO TO 16
8220=  24  CL=C
8230=      GO TO 16
8240=  26  WRITE 2, FXN
8250=  28  A1=-1.0
8260=      A2=1.0
8270=      CON=1.0 E-20
8280=      IF(C.LE.A1) C=A1
8290=      IF(C.GE.A2) C=A2
8300=
8310=C     CALCULATE SPHERICAL RADIUS OF 95% CONFIDENCE CONE
8320=      THECO=ACOS(C)
8330=      IF(THECO.LE.ACC) THECO=0.0
8340=
8350=C     CALCULATE AZIMUTHAL HALF-ANGLE OF CONFIDENCE
8360=      AB=PI/2.0
8370=      PHIA=PHI
8380=      IF(PHI.LE.AB) GO TO 29
8390=      PHIA=PI-PHI
8400=  29  IF(THECO.GT.PHIA) GO TO 30
8410=      A3=COS(THECO)
8420=      IF(A3.EQ.0.0) A3=CON
8430=      A4=COS(PHI)
8440=      IF(A4.EQ.0.0) A4=CON
8450=      A5=SIN(PHI)
8460=      IF(A5.EQ.0.0) A5=CON
8470=      BB=(A3**2-A4**2)/A5
8480=      THEAZ=ACOS(BB)
8490=      IF(THEAZ.LE.ACC) THEAZ=0.0
8500=      GO TO 32
8510=  30  THEAZ=PI
8520=
8530=C     CALCULATE PRECISION PARAMETER K
8540=  32  XK=D/A
8550=      RETURN
8560=      END
```

COMPUTER STATEMENT NOMENCLATURE

Main Program

| | |
|---|---|
| N = | Number of azimuth and dip pairs to be entered |
| XX = | Azimuth value entered |
| YY = | Dip value entered |
| AZM (I) = | XX |
| DIP(I) = | YY |
| PI = | $\pi$ |
| CON = | Constant used to convert degrees to radians |
| PHI(I) = | $\phi_i = $ DIP(I) + 90° = $\phi$-angle for original vector i |
| THET(I) = | $\theta_i = \theta$-angle for original vector i |
| PHIP(I) = | $\phi_i' = \phi$-angle for primed vector i |
| THETP(I) = | $\theta_i' = \theta$-angle for primed vector i |
| KEY2 = | If KEY2 = 1, there is no preferred azimuth and dip |
| RX = | X-component of preferred orientation vector |
| RY = | Y-component of preferred orientation vector |
| RZ = | Z-component of preferred orientation vector |
| RXYZ = | Magnitude of preferred orientation vector |
| TXYZ = | Azimuth of preferred orientation vector |
| RXY = | XY-plane component of preferred orientation vector |
| PXYZ = | $\phi$-angle for preferred orientation vector |
| THECO = | Dispersion analysis spherical radius $\theta_c$ of circle of confidence |
| THEAZ = | Dispersion analysis azimuthal half-angle of confidence $\theta_a$ |

Subroutine VECMAX1

| | |
|---|---|
| THETR(J) = | $\theta$-angle for reference vector j |
| PHIR(J) = | $\phi$-angle for reference vector j |
| RRX = | X-component of reference vector j |
| RRY = | Y-component of reference vector j |
| RRZ = | Z-component of reference vector j |
| RX = | X-component of original vector i |
| RY = | Y-component of original vector i |
| RZ = | Z-component of original vector i |
| RXP = | X-component of primed vector i |
| RYP = | Y-component of primed vector i |
| RZP = | Z-component of primed vector i |
| E = | Dot product between reference vector j and original vector i |
| F = | Dot product between reference vector j and primed vector i |
| GAM = | Angle between reference vector j and original vector i |
| GAMP = | Angle between reference vector j and primed vector i |
| RSX = | X-component of vector i (original or primed) closest to reference vector j |
| RSY = | Y-component of vector i (original or primed) closest to reference vector j |
| SUMPX = | Sum of X-components of vectors i closest to reference vector j |
| SUMRY = | Sum of Y-components of vectors i closest to reference vector j |
| SUMRZ = | Sum of Z-components of vectors i closest to reference vector j |
| RFXYZ(J) = | Magnitude of resultant vector j associated with component sums of vectors i closest to reference vector j |
| RFX(J) = | X-component of RFXYZ(J) |
| RFY(J) = | Y-component of RFXYZ(J) |
| RFZ(J) = | Z-component of RFXYZ(J) |
| RXYZM = | Magnitude of resultant vector j which has the maximum magnitude |
| RXM = | X-component of RXYZM |
| RYM = | Y-component of RXYZM |
| RZM = | Z-component of RXYZM |
| AN(KK) = | Indicator to show which resultant vectors have identical maximum magnitudes. |

Subroutine REFVEC

| | |
|---|---|
| AN(I) | Indicator to show which resultant vectors have identical maximum magnitudes |
| RX = | X-component of resultant maximum magnitude vector j |
| RY = | Y-component of resultant maximum magnitude vector j |
| RZ = | Z-component of resultant maximum magnitude vector j |
| TXYZ = | $\theta$-angle for maximum magnitude vector j |
| PXYZ = | $\phi$-angle for maximum magnitude vector j |
| THETT(J) = | $\theta$-angle for maximum magnitude vector j to be used as "temporary original vector j" in Subroutine VECMAX2 |
| THEPT(J) = | Primed counterpart of THETT(J) |
| PHIT(J) = | $\phi$-angle for maximum magnitude vector j to be used as "temporary original vector j" in Subroutine VECMAX2 |
| PHIPT(J) = | Primed counterpart of PHIT(J) |
| AA = | $\theta$-angle for final reference vector |
| BB = | $\phi$-angle for final reference vector |

Subroutine VECMAX2

| | |
|---|---|
| THETX(J) = | $\theta$-angle for reference vector j |
| PHIX(J) = | $\phi$-angle for reference vector j |
| RRX = | X-component of reference vector j |
| RRY = | Y-component of reference vector j |
| RRZ = | Z-component of reference vector j |
| RX = | X-component of temporary original vector i |
| RY = | Y-component of temporary original vector i |
| RZ = | Z-component of temporary original vector i |

COMPUTER STATEMENT NOMENCLATURE

| | |
|---|---|
| RXP = | X-component of temporary primed vector i |
| RYP = | Y-component of temporary primed vector i |
| RZP = | Z-component of temporary primed vector i |
| E = | Dot product between reference vector j and temporary original vector i |
| F = | Dot product between reference vector j and temporary primed vector i |
| GAM = | Angle between reference vector j and temporary original vector i |
| GAMP = | Angle between reference vector j and temporary primed vector i |
| RSX = | X-component of vector i (temporary original or temporary primed) closest to reference vector j |
| RSY = | Y-component of vector i (temporary original or temporary primed) closest to reference vector j |
| RSZ = | Z-component of vector i (temporary original or temporary primed) closest to reference vector j |
| SUMRX = | Sum of X-components of vectors i closest to reference vector j |
| SUMRY = | Sum of Y-components of vectors i closest to reference vector j |
| SUMRZ = | Sum of Z-components of vectors i closest to reference vector j |
| RFXYZ(J) = | Magnitude of resultant vector j associated with component sums of vectors i closest to reference vector j |
| RFX(J) = | X-component of RFXYZ(J) |
| RFY(J) = | Y-component of RFXYZ(J) |
| RFZ(J) = | Z-component of RFXYZ(J) |
| RXYZM = | Magnitude of resultant vector j which has the maximum magnitude final reference vector |
| RXM = | X-component of RXYZM |
| RYM = | Y-component of RXYZM |
| RZM = | Z-component of RXYZM |
| Subroutine DISPER | |
| P = | Probability and 0.05 value produces a 95% confidence cone about preferred orientation result |
| XN = | Number of unit vectors = N |
| A = | $N - R_{xyz}$ |
| B = | $1/(N-1)$ |
| C = | Term |
| D = | $N - 1$ |
| S = | s |
| X = A | Lower limit for N-R |
| X = B | Upper limit for N-R |
| XNFAC = | N! |
| CU = | Upper limit for $\cos^{-1}(\theta_c)$ = upper limit for c |
| CL = | Lower limit for c |
| C = | c |
| FXN = | 1st term |
| XNMSF = | N-s |
| SFAC = | s! |
| FNUM = | Numerator of s+1 term |
| FXN = | Sum of s+1 terms |
| A1 = | Minimum possible value for c |
| A2 = | Maximum possible value for c |
| THECO = | Spherical radius $\theta_c$ of 95% confidence cone |
| PHI = | $\phi$-angle for preferred orientation vector |
| BB = | Term |
| THEAZ = | Azimuthal half-angle of confidence $\theta_a$ |
| XK = | Precision parameter k |

PRINTOUT EXAMPLE
PROGRAM TRUDIP
ANALYSIS AND PROGRAMMING -
D.C. UHRI - DECEMBER
MOBIL RESEARCH AND DEVELOPMENT
CORPORATION - FIELD RESEARCH LABORATORY
PRINTOUT EXAMPLE

| INPUT DATA | AZIMUTH | DIP |
|---|---|---|
| | 0.0 | 0.0 |
| | 5.0 | 0.0 |
| | 10.0 | 0.0 |
| | 20.0 | 0.0 |
| | 30.0 | 0.0 |
| | 40.0 | 0.0 |
| | 50.0 | 0.0 |
| | 70.0 | 0.0 |
| | 110.0 | 0.0 |
| | 130.0 | 0.0 |
| | 140.0 | 0.0 |
| | 150.0 | 0.0 |
| | 160.0 | 0.0 |
| | 170.0 | 0.0 |
| | 175.0 | 0.0 |

| CALCULATED RESULTS | | |
|---|---|---|
| | RX = | 0. |
| | RY = | .1207515E+02 |
| | RZ = | 0. |
| | RXY = | .1207515E+02 |
| | RXYZ = | .1207515E+02 |
| | THETA = | 0. |
| | PHI = | .9000000E+02 |
| | N = | 15 |
| | K = | .4786563E+01 |
| | THECO = | .1957455E+02 |
| | THEAZ = | .2740778E+02 |

SINCE PHI=90 DEGREES, THE AZIMUTH SHOWN ABOVE IS BI-MODAL. 180 DEGREES MAY BE ADDED TO OR SUBTRACTED FROM THIS VALUE.

| COMPUTER PRINTOUT NOMENCLATURE | |
|---|---|
| RX = | X-component of vector $R_{xyz}$ |
| RY = | Y-component of vector $R_{xyz}$ |
| RZ = | Z-component of vector $R_{xyz}$ |
| RXY = | Projection of Vector $R_{xyz}$ on XY-plane |
| RXYZ = | Vector sum of N unit vectors |
| THETA = | Resultant azimuth of unit vectors |
| PHI = | Resultant cone angle as measured downward from +Z axis |
| N = | Number of unit vectors |
| THECO = | Spherical radius of resultant vector cone of confidence for 95% confidence limits |
| THEAZ = | Azimuth half-angle of confidence related to the 3-dimensional cone of confidence for 95% confidence limits |

What is claimed is:

1. The method of producing a plot of preferred geological orientation of a subsurface formation comprising:
   (a) repeatedly measuring said geological orientation;
   (b) generating original vectors representing the azimuth and dip of the measurements;
   (c) converting said original vectors into lineations representing the extension of each vector to its intersection with a unit sphere;
   (d) designating one of said original vectors as a reference vector;
   (e) selecting the half axes of all lineations within 90° of the reference vector and transforming them into unit vectors;
   (f) vector averaging the selected unit vectors to produce a resultant vector;
   (g) determining the magnitude of said resultant vector;
   (h) repeating steps (c)-(f) for each of said original vectors;
   (i) selecting the resultant vector having the maximum magnitude as the preferred orientation of said formation;
   (j) repeating steps (b)-(i) for a plurality of measurements; and
   (k) plotting the resultant vectors having maximum magnitudes.

2. The method recited in claim 1 further comprising:
   measuring the azimuth and dip of said subsurface formation at a plurality of depths; and
   performing steps (b)-(i) on all measurements in successive depth intervals.

3. The method recited in claim 1 further comprising:
   measuring the azimuth and dip of said subsurface formations at a plurality of depths;
   performing steps (b)-(i) on all measurements in a depth interval;
   moving said depth interval in increments of depth which are less than said depth interval; and
   repeating the preceding steps with said depth interval at succeeding increments.

4. The method recited in claim 1 wherein a plurality of said resultant vectors, selected in step (i) when steps (b)-(i) are repeated, have the same maximum magnitude, further comprising:
   converting said last named resultant vectors into lineations representing the extension of each vector to its intersection with a unit sphere; and
   repeating steps (d)-(i) of claim 1.

5. The method recited in claim 1 wherein step (a) comprises:
   traversing a borehole with a dipmeter logging tool; and
   measuring the azimuth and dip of said subsurface formation with said logging tool at each of a plurality of depths in said borehole.

6. The method recited in claim 1 further comprising:
   plotting a line having an inclination representing the azimuth of the selected resultant vector, a horizontal position relative to a dip scale representing the dip of the selected resultant vectors, and a vertical position relative to a depth scale representing the depth at which said measurements are made.

7. The method recited in claim 1 wherein the measurements of step (a) are the azimuth and dip of subsurface formations and wherein the step of plotting includes plotting said resultant vectors as a function of the depth of said formations.

8. The method of determining preferred geological orientation of a subsurface formation comprising:
   (a) generating original vectors representing the azimuth and dip of measurements of geological orientation;
   (b) converting said vectors into lineations representing the extension of each vector to its intersection with a unit sphere;
   (c) designating one of said original vectors as a reference vector;
   (d) selecting the half axes of all lineations within 90° of the reference vector and transforming them into unit vectors;
   (e) vector averaging the selected unit vectors to produce a resultant vector;
   (f) determining the magnitude of said resultant vector;
   (g) repeating steps (c)-(f) for each of said original vectors;
   (h) selecting the resultant vector having the maximum magnitude as the preferred orientation; and
   (i) plotting the resultant vectors having magnitude as determined by step (h).

9. The method recited in claim 8 wherein a plurality of the resultant vectors, selected in step (h) after each repetition of steps (c)-(f), have the same maximum magnitude, further comprising:
   converting said last named resultant vectors into lineations representing the extension of each vector to its intersection with a unit sphere; and
   repeating steps (a)-(h) of claim 8.

10. The method recited in claim 8 wherein the step (i) comprises:
    plotting a tadpole representation having an inclination representing the azimuth of the selected resultant vector, a horizontal position relative to a dip scale representing the dip of the selected resultant vectors, and a vertical position relative to a depth scale representing the depth at which said measurements are made.

11. The method of determining preferred geological orientation of a subsurface formation comprising:
    (a) measuring the azimuth and dip of subsurface formation at a plurality of depths in successive depth intervals;
    (b) generating original vectors representing the azimuth and dip of said measurements of geological orientation;
    (c) converting said vectors into lineations representing the extension of each vector to its intersection with a unit sphere;
    (d) designating one of said original vectors as a reference vector;

(e) selecting the half axes of all lineations within 90° of the reference vector and transforming them into unit vectors;

(f) vector averaging the selected unit vectors to produce a resultant vector;

(g) determining the magnitude of said resultant vector;

(h) repeating steps (d)-(g) for each of said original vectors; and (i) selecting the resultant vector having the maximum magnitude as the preferred orientation.

12. The method of determining preferred geological orientation of a subsurface formation comprising:

(a) measuring the azimuth and dip of subsurface formations at a plurality of depths in a depth interval;

(b) generating original vectors representing the azimuth and dip of measurement of geological orientation;

(c) converting said vectors into lineations representing the extension of each vector to its intersection with a unit sphere;

(d) designating one of said original vectors as a reference vector;

(e) selecting the half axes of all lineations within 90° of the reference vector and transforming them into unit vectors;

(f) vector averaging the selected unit vectors to produce a resultant vector;

(g) determining the megnitude of said resultant vector;

(h) repeating steps (d)-(g) for each of said original vectors;

(i) selecting the resultant vector having the maximum magnitude as the preferred orientation;

(j) moving said intervals in increments of depth which are less than said depth interval; and (k) repeating steps (b)-(i) with said depth interval at succeeding increments.

13. The method of determining preferred geological orientation of a subsurface formation comprising:

(a) traversing a borehole with a dipmeter logging tool;

(b) measuring the azimuth and dip of said subsurface formations with said logging tool at each of a plurality of depths in said borehole;

(c) converting said vectors into lineations representing the extension of each vector to its intersection with a unit sphere;

(d) designating one of said original vectors as a reference vector;

(e) selecting the half axes of all lineations within 90° of the reference vector and transforming them into unit vectors;

(f) vector averaging the selected unit vectors to produce a resultant vector;

(g) determining the magnitude of said resultant vector;

(h) repeating steps (d)-(g) for each of said original vectors; and (i) selecting the resultant vector having the maximum magnitude as the preferred orientation.

* * * * *